United States Patent
Nguyen et al.

(10) Patent No.: US 9,688,905 B2
(45) Date of Patent: Jun. 27, 2017

(54) METHODS FOR ENHANCING PROPPED FRACTURE CONDUCTIVITY

(71) Applicant: Halliburton Energy Services, Inc., Houston, TX (US)

(72) Inventors: Philip D. Nguyen, Houston, TX (US); Brian D Mock, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/780,735

(22) PCT Filed: Nov. 11, 2013

(86) PCT No.: PCT/US2013/069428
§ 371 (c)(1),
(2) Date: Sep. 28, 2015

(87) PCT Pub. No.: WO2015/069293
PCT Pub. Date: May 14, 2015

(65) Prior Publication Data
US 2016/0053160 A1    Feb. 25, 2016

(51) Int. Cl.
*C09K 8/46* (2006.01)
*C09K 8/68* (2006.01)
(Continued)

(52) U.S. Cl.
CPC ............... *C09K 8/68* (2013.01); *C09K 8/467* (2013.01); *C09K 8/565* (2013.01); *C09K 8/5751* (2013.01);
(Continued)

(58) Field of Classification Search
CPC .......... C09K 8/68; C09K 8/467; C09K 8/565; E21B 43/26; E21B 43/267
See application file for complete search history.

(56) References Cited

U.S. PATENT DOCUMENTS 5,775,425 A * 7/1998 Weaver ............... C09K 8/5086
166/276
5,833,000 A * 11/1998 Weaver ............... C09K 8/5086
166/276

(Continued)

FOREIGN PATENT DOCUMENTS

| EP | 2527586 A1 | 11/2012 |
| WO | WO-2007078995 A1 | 7/2007 |
| WO | WO-2015069293 A1 | 5/2015 |

OTHER PUBLICATIONS

"International Application Serial No. PCT/US2013/069428, International Search Report mailed Aug. 12, 2014", 3 pgs.

(Continued)

*Primary Examiner* — Zakiya W Bates
*Assistant Examiner* — Crystal J Miller
(74) *Attorney, Agent, or Firm* — Craig W. Roddy; Tumey L.L.P.

(57) ABSTRACT

Various embodiments disclosed relate to methods of treating a subterranean formations that provide enhanced fracture conductivity over other methods. In various embodiments, the present invention provides a method of treating a subterranean formation. The method can include obtaining or providing a composition including a tackifier. The composition can have a viscosity less than about 20 cP. The method can include placing the composition in a subterranean formation downhole. The method can also include fracturing the subterranean formation with the composition.

20 Claims, 14 Drawing Sheets

(51) Int. Cl.

| | |
|---|---|
| *E21B 43/26* | (2006.01) |
| *C09K 8/80* | (2006.01) |
| *E21B 43/267* | (2006.01) |
| *C09K 8/565* | (2006.01) |
| *C09K 8/575* | (2006.01) |
| *C09K 8/64* | (2006.01) |
| *C09K 8/88* | (2006.01) |
| *C09K 8/467* | (2006.01) |
| *C09K 8/035* | (2006.01) |
| *C09K 8/52* | (2006.01) |
| *C09K 8/60* | (2006.01) |
| *C09K 8/74* | (2006.01) |

(52) U.S. Cl.
CPC .............. *C09K 8/64* (2013.01); *C09K 8/685* (2013.01); *C09K 8/80* (2013.01); *C09K 8/805* (2013.01); *C09K 8/88* (2013.01); *E21B 43/26* (2013.01); *E21B 43/267* (2013.01); *C09K 8/035* (2013.01); *C09K 8/52* (2013.01); *C09K 8/602* (2013.01); *C09K 8/74* (2013.01); *C09K 2208/02* (2013.01); *C09K 2208/12* (2013.01)

(56) References Cited

U.S. PATENT DOCUMENTS

| | | | | |
|---|---|---|---|---|
| 5,853,048 A * | 12/1998 | Weaver | ............... | C09K 8/5086 166/279 |
| 5,871,049 A * | 2/1999 | Weaver | ............... | C09K 8/5086 166/276 |
| 7,204,311 B2 * | 4/2007 | Welton | ............... | C09K 8/5083 166/295 |
| 7,261,157 B2 * | 8/2007 | Nguyen | ............... | C09K 8/508 166/278 |
| 7,281,581 B2 * | 10/2007 | Nguyen | ............... | E21B 43/267 166/280.2 |
| 7,819,192 B2 * | 10/2010 | Weaver | ............... | C09K 8/68 166/280.2 |
| 8,076,271 B2 * | 12/2011 | Blauch | ............... | C09K 8/5083 166/305.1 |
| 8,082,994 B2 * | 12/2011 | Nguyen | ............... | E21B 43/267 166/276 |
| 8,136,595 B2 * | 3/2012 | Weaver | ............... | C09K 8/68 166/281 |
| 8,267,176 B2 * | 9/2012 | Nguyen | ............... | C09K 8/508 166/285 |
| 8,443,885 B2 | 5/2013 | Rickman et al. | | |
| 8,636,065 B2 * | 1/2014 | Lesko | ............... | C09K 8/665 166/280.1 |
| 8,763,699 B2 * | 7/2014 | Medvedev | ............... | C09K 8/665 166/280.1 |
| 8,978,759 B2 * | 3/2015 | Neal | ............... | C09K 8/62 166/280.1 |
| 2004/0235677 A1 * | 11/2004 | Nguyen | ............... | C09K 8/032 507/200 |
| 2005/0092489 A1 * | 5/2005 | Welton | ............... | C09K 8/5083 166/280.2 |
| 2005/0277554 A1 * | 12/2005 | Blauch | ............... | C09K 8/5083 507/224 |
| 2006/0113078 A1 * | 6/2006 | Nguyen | ............... | E21B 43/267 166/280.2 |
| 2006/0118299 A1 * | 6/2006 | Nguyen | ............... | C09K 8/508 166/276 |
| 2007/0151729 A1 * | 7/2007 | Hoch | ............... | C09K 8/516 166/281 |
| 2007/0155630 A1 * | 7/2007 | Hoch | ............... | C09K 8/516 507/202 |
| 2007/0187097 A1 * | 8/2007 | Weaver | ............... | C09K 8/68 166/280.2 |
| 2008/0011476 A1 * | 1/2008 | Nguyen | ............... | C09K 8/68 166/276 |
| 2008/0078545 A1 * | 4/2008 | Welton | ............... | C09K 8/08 166/278 |
| 2008/0128131 A1 * | 6/2008 | Nguyen | ............... | E21B 43/267 166/280.2 |
| 2009/0298720 A1 * | 12/2009 | Nguyen | ............... | C09K 8/74 507/204 |
| 2010/0081584 A1 * | 4/2010 | Perez | ............... | C09K 8/524 507/119 |
| 2010/0212906 A1 * | 8/2010 | Fulton | ............... | C09K 8/68 166/308.5 |
| 2011/0030950 A1 * | 2/2011 | Weaver | ............... | C09K 8/68 166/276 |
| 2011/0053810 A1 * | 3/2011 | Norman | ............... | C09K 8/035 507/205 |
| 2011/0083849 A1 * | 4/2011 | Medvedev | ............ | C09K 8/665 166/280.1 |
| 2011/0120712 A1 | 5/2011 | Todd et al. | | |
| 2011/0146997 A1 * | 6/2011 | Nguyen | ............... | C09K 8/508 166/309 |
| 2011/0162849 A1 | 7/2011 | Soliman et al. | | |
| 2011/0240293 A1 * | 10/2011 | Lesko | ............... | C09K 8/665 166/280.1 |
| 2013/0025867 A1 | 1/2013 | Sun et al. | | |
| 2013/0048282 A1 | 2/2013 | Adams et al. | | |
| 2013/0312962 A1 * | 11/2013 | Weaver | ............... | C09K 8/805 166/280.1 |
| 2014/0054033 A1 * | 2/2014 | Nguyen | ............... | E21B 7/18 166/280.1 |
| 2014/0060842 A1 * | 3/2014 | Neal | ............... | C09K 8/62 166/308.1 |
| 2015/0107832 A1 * | 4/2015 | DeWolf | ............... | C09K 8/52 166/266 |

OTHER PUBLICATIONS

"International Application Serial No. PCT/US2013/069428, Written Opinion mailed Aug. 12, 2014", 17 pgs.
Nguyen, Philip D., et al., "Evaluating Treatment Methods for Enhancing Microfracture Conductivity in Tight Formations", SPE 167092, *SPE Unconventional Resources Conference and Exhibition-Asia Pacific*, Nov. 11-13, Brisbane, Australia, (2013), 1-14.
"Australian Application Serial No. 2013404976, First Examiner Report mailed Jul. 15, 2016", 3 pgs.
"United Kingdom Application Serial No. 1604374.7, Office Action mailed Jul. 6, 2016", 1 pg.
Nguyen, Philip D., et al., "Evaluating Treatment Methods for Enhancing Microfracture Conductivity in Tight Formations", SPE Unconventional Resources Conference and Exhibition-Asia Pacific, Nov. 11-13, Brisbane, Australia, (2013).

* cited by examiner

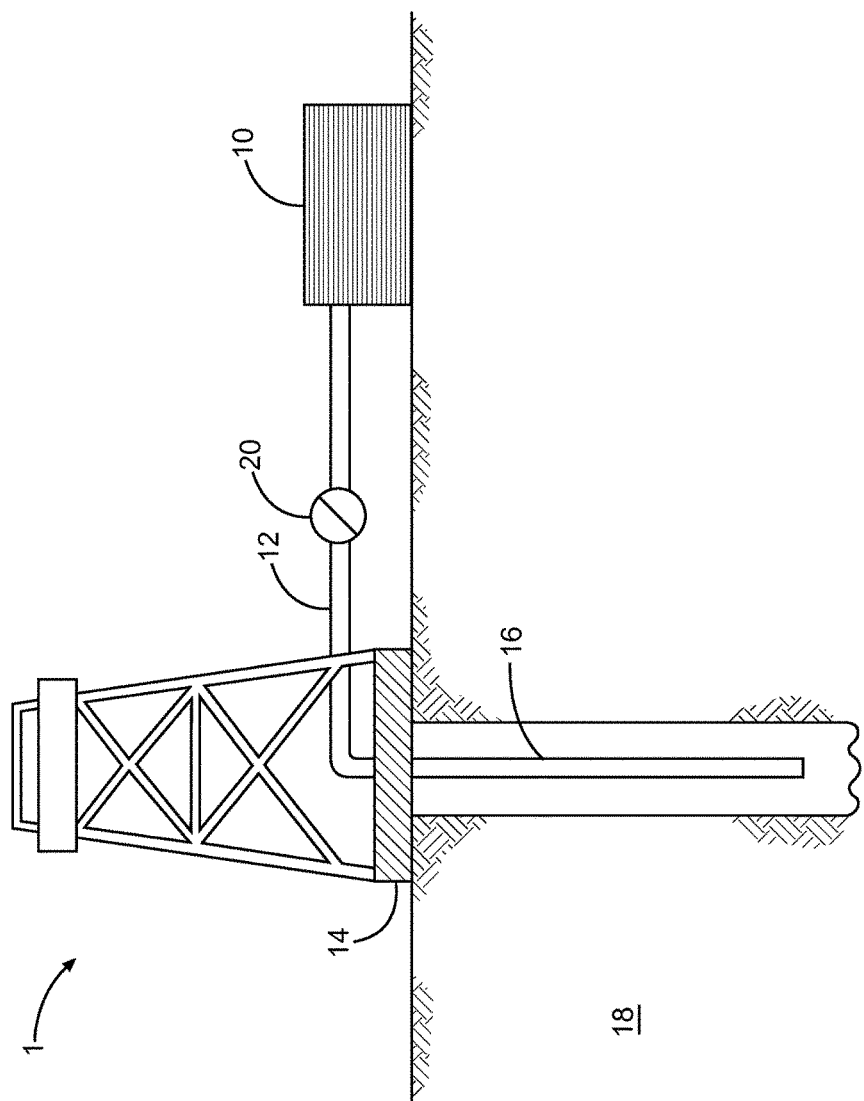

METHODS FOR ENHANCING PROPPED FRACTURE CONDUCTIVITY

PRIORITY APPLICATION

This application is a U.S. National Stage Filing under 35 U.S.C. 371 from International Application No. PCT/US2013/069428, filed on 11 Nov. 2013, the application is incorporated herein by reference in its entirety.

BACKGROUND OF THE INVENTION

To create microfractures as part of complex fracture network in subterranean formations, operators rely on the use of low viscosity fluid (e.g., slickwater) as the main fracturing fluid and small size proppant (e.g., 100-mesh) as the propping agent. However, proppant particulates tend to settle quickly to the lower side of the fracture, causing most of the created fractures on top of the proppant bed to close which greatly diminishes the conductive flow path. Crosslinking of gel carrier fluid or use of lower density proppant can help to mitigate the settling, but these techniques can be complex and unreliable. For example, use of crosslinked gels can increase complexity and cost, it can be difficult to evenly penetrate microfractures using gels, and high-viscosity fluids can cause permanent damage to fracture conductivity. In another example, use of a lower density proppant having the proper density range can be time-consuming and can raise costs, and it can be difficult to select a lower density proppant such that the proppant neither moves to the top of the carrier fluid nor sinks to the bottom. Neither crosslinked gels nor low-density proppant can affix the proppant particles to the faces of the fracture, leaving the proppant particles mobile until sufficient closure pressure occurs to trap proppant particles between faces.

SUMMARY OF THE INVENTION

In various embodiments, the present invention provides a method of treating a subterranean formation. The method can include obtaining or providing a composition. The composition includes a tackifier. The composition has a viscosity of less than about 20 cP at standard temperature and pressure. The method includes placing the composition in a subterranean formation downhole. The method also includes fracturing the subterranean formation with the composition.

In various embodiments, the present invention provides a method of treating a subterranean formation. The method includes obtaining or providing a composition. The composition includes a tackifier. The composition also includes a proppant having a particle size of about 150 mesh or a smaller particle size. The composition has a viscosity of less than about 20 cP at standard temperature and pressure. The method also includes placing the composition in a subterranean formation downhole.

In various embodiments, the present invention provides a method of treating a subterranean formation. The method includes obtaining or providing a composition. The composition includes a tackifier and an organic clay stabilizer. The composition has a viscosity of less than about 20 cP at standard temperature and pressure. The method includes placing the composition in a subterranean formation downhole. The method includes fracturing the subterranean formation with the composition, to form at least one fracture. The method includes substantially coating at least part of a face of the fracture with the composition to form at least one adhered layer of the proppant on the face. In some embodiments, the composition further includes a proppant having a particle size of about 150 mesh or a smaller particle size.

Various embodiments of the present invention provide certain advantages over other methods of increasing or maintaining fracture conductivity, at least some of which are unexpected. For example, in some embodiments, the method can prop open a greater proportion of generated fractures, resulting in a greater overall conductivity of the generated fracture and an overall more productive well. In some embodiments, the method can be effective to generate high-permeability fractures in tight formations. In some embodiments, proppant and low-viscosity fracturing fluid are pumped simultaneously, avoiding separate steps of fracturing or surface agent application followed by proppant application, saving time and money.

Other methods can result in the majority of the proppant at the top or bottom portion of a fracture, such that when the fracture closes only some of the fracture is propped open by the proppant while other areas completely close. In contrast, in some embodiments, the method can more evenly distribute proppant between the upper and lower portions of a generated fracture, and the method can adhere at least some of the proppant to the faces of the fracture, such as to form at least partial monolayers of proppant on the faces of the fracture. In various embodiments, the adhered proppant remains distributed on the face of the fracture as closure occurs, allowing the proppant to prop open the fracture more evenly than other methods, generating a treated subterranean formation having higher conductivity. In some embodiments, as compared to other methods, the method can distribute the proppant more evenly between near-well and far-well locations in the fracture.

Unlike higher viscosity carrier liquids such as liquids including gels, crosslinked gels, or other viscosifiers, in various embodiments the subterranean treatment composition has a low viscosity, such as a viscosity less than about 20 cP. The low viscosity of the composition in various embodiments allows the composition to more effectively generate microfractures and to more effectively permeate those microfractures to generate further fractures, generating complex and effective fracture networks. The low viscosity of the composition in various embodiments avoids the reduction in conductivity that higher viscosity fluids can cause to fracture networks such as by clogging pores or by damaging fracture networks.

In various embodiments, the small proppant used is more readily available than proppants that are generally employed in hydraulic fracturing and lower density proppants. Unlike techniques that include the use of lower density proppants, various embodiments can achieve an even vertical distribution of adhered proppant within the fracture with the use of a normal-density proppant. In various embodiments, the use of a normal-density proppant can be less costly and less complex than the selection and use of low density proppants.

BRIEF DESCRIPTION OF THE FIGURES

The drawings illustrate generally, by way of example, but not by way of limitation, various embodiments discussed in the present document.

FIG. 1 illustrates a system or apparatus for delivering a composition downhole, in accordance with various embodiments.

DETAILED DESCRIPTION OF THE INVENTION

Figure 2B:
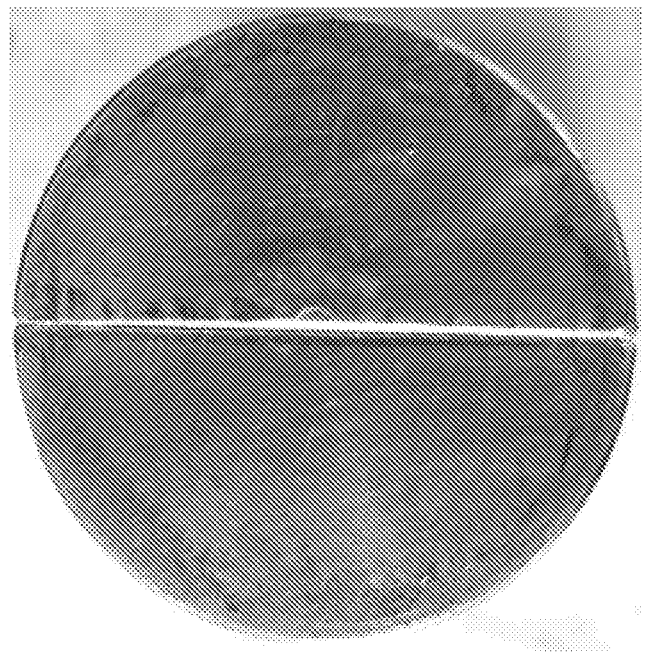
FIG. 2a-b illustrate the two surfaces of a split aluminum cylinder, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

In various embodiments, the present invention provides a method of contacting a tackifier-containing composition with a face of a fracture and adhereing proppant particles to the face of the fracture thereby. In some embodiments, instead of pumping separately a pad fluid stage containing the aqueous surface modification agent and then a proppant slurry stage as commonly performed in many hydraulic fracturing treatments, the method described herein can involve injecting a slickwater fluid containing a low concentration of an aqueous-based surface modification agent (e.g., a tackifier), a low concentration of small size propping agent (e.g., 150 mesh or a smaller particle size), to serve both functions as a pad fluid for creating main fractures and microfractures, coating the fracture faces with a tacky film, and placing proppant particulates into these fractures.

In one embodiment, a composition including a low concentration of fine particulates, such as 325-mesh or ceramic microspheres, blended with a low concentration of tackifier solution, is used as the pad fluid such that this fluid is the first fluid to which the surfaces of the fractures are exposed as soon as they are generated as part of the hydraulic fracturing treatment. This injection allows the "microproppant" to enter the microfractures soon after the fractures are generated. Following this pad fluid stage, an injection stage of combined ASMA and larger size particulates, such as 100-mesh or 40/70-mesh sand (as a slurry) can be injected, to be placed in the main fractures and their branches to maintain conductive flow paths connecting with the wellbore. Alternately, following the injection of pad fluid containing both the tackifier and particulates, a volume of a second pad fluid containing mainly tackifier is injected and placed into the created fractures, to ensure that the fracture faces, especially those of the main fractures and their branches, are pretreated with a sufficient amount of tackifier to enhance the adhesion/attachment of larger size particulates to the fracture faces.

In some embodiments, the present invention provides a method of treating a subterranean formation. The method includes obtaining or providing a composition including a tackifier. The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

The method can include hydraulic fracturing, such as a method of hydraulic fracturing to generate a fracture or flow pathway. The composition can be a fracturing fluid. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during a pad of the fracturing. The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

The composition can have any suitable viscosity. For example, the composition can have a viscosity of about 0.001 cP to about 20 cP, or about 0.1 cP to about 15 cP, or about 0.001 cP or less, or about 0.01 cP, 0.1, 0.5, 1, 2, 3, 4, 5, 6, 7, 8, 9, 10, 11, 12, 13, 14, 15, 16, 17, 18, 19, or about 20 cP or more.

The tackifier in the composition can contact a face of least one fracture. The fracture contacted can be a fracture generated by fracturing the subterranean formation with the composition, or a fracture that is already in the subterranean formation prior to placing the composition in the subterranean formation. The tackifier can substantially coat a face of at least one fracture generated by the fracturing. In some embodiments, the method can include placing a proppant in the subterranean formation prior to placing the composition in the subterranean formation. In some embodiments, the method can include placing a proppant in the subterranean formation after placing the composition in the subterranean formation.

In some embodiments, the composition that includes that tackifier further includes a proppant. The proppant can be any suitable material that keeps an induced hydraulic fracture at least partially open during or after a fracturing treatment. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. The proppant can have any suitable particle size, wherein the particle size is the largest dimension of the particle such as an average particle size. For example, the proppant can have a particle size of about 150 mesh to about 1000 mesh, about 150 mesh to about 400 mesh, about 150 mesh or a larger particle size, about 150 mesh or a smaller particle size, or about 160, 180, 200, 220, 240, 260, 280, 300, 320, 340, 360, 380, 400, 425, 450, 475, 500, 550, 600, 650, 700, 750, 800, 850, 900, 950, or about 1000 mesh or a smaller particle size. In some embodiments, the proppant can have an average particle size of about 100 µm to about 10 µm, about 10 µm to about 25 µm, about 25 µm to about 43 µm, about 43 µm to about 85 µm, or about 85 µm to about 100 µm. In some embodiments, the proppant can have a distribution of particle sizes clustering around multiple averages, such as one, two, three, or four different average particle sizes. Any suitable amount of the composition can be the proppant, such as about 0.001 wt % to about 5 wt % of the composition, about 0.01 wt % to about 2 wt %, or about 0.001 wt % or less, or about 0.005, 0.01, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, Of about 2 wt % or more.

The method can include substantially coating with the composition at least part of a face of at least one fracture formed by the fracturing, such that the composition has an at least partial layer of tackifier thereon. The coating of the face of the at least one fracture can include forming at least one adhered layer (e.g., at least partial layer) of proppant on the face. The tackifier can randomly coat onto the fracture faces to enhance the attachment or adhesion of proppant particulates, thereby increasing the distribution of the proppant by allowing formation of partial monolayer of proppant in the created fractures.

In some embodiments, the method includes substantially coating at least some of the proppant with the tackifier. The coating of the proppant can be sufficient to adhere proppant particles to one another and form clusters or aggregates of proppant particles. The adhereing of proppant particles to one another can allow clusters or aggregates of proppant particles to act as mini-pillars to prop the fracture open.

In some embodiments, the composition is a liquid, a foam, or a combination thereof. For example, by volume, the composition can be about 5% foam or less, with the remainder liquid, or about 10%, 15, 20, 25, 30, 35, 40, 45, 50, 55, 60, 65, 70, 75, 80, 85, 90, 95, 96, 97, 98, or about 99% foam with the remainder liquid.

In some embodiments, the composition is aqueous. The composition can have any suitable wt % water, such as about 0.001 wt % to about 99.999 wt %, about 50 wt % to about 99 wt %, about 0.001 wt % or less, 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition is water. In some embodiments, the composition is a water external emulsion (e.g., with oil or organic phase as the internal phase).

In some embodiments, the composition is substantially oil or organic solvent, or includes an oil or organic solvent. Any suitable wt % of the composition can be oil or organic solvent, such as about 0.001 wt % to about 99.999 wt % of the composition, about 50 wt % to about 99 wt %, or about 0.001 wt % or less, 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99 wt %, or about 99.999 wt % or more of the composition is at least one of oil and organic solvent. In some embodiments, the composition is an oil-external (e.g. oil-external or organic external, with water internal phase) emulsion. For example, the organic solvent can be at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, and dimethyl formamide.

Tackifier.

The tackifier can be any suitable tackifier, such that the method can be carried out as described herein. The tackifier can be one tackifier or can be a combination of two or more tackifiers. In some embodiments, the tackifier is immediately tacky, and in other embodiments, the tackifier lacks tackiness or lacks full tackiness until a chemical reaction occurs in a suitable location and at a suitable time that gives the tackifier more tackiness. The tackifier can have any suitable concentration in the composition, such that the method can be carried out as described herein. For example, about 0.001 wt % to about 30 wt % of the composition can be tackifier, or about 0.1 wt % to about 10 wt %, or about 0.001 wt % or less, or about 0.005 wt %, 0.01, 0.05, 0.1, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, or about 30 wt % or more of the composition can be tackifier.

The tackifier can be an aqueous-soluble tackifier, such that it can be dissolved in an aqueous carrier fluid, or used as an emulsion in an oil-based carrier fluid. The tackifier can be an organic-soluble tackifier, such that it can be dissolved in an oil-based carrier fluid, or used as an emulsion in an aqueous carrier fluid. In some embodiments, the tackifier can be non-hardening. In some embodiments, the tackifier can be a liquid, viscous liquid, or gel at the temperature and pressure conditions downhole, such that the tackifier does not, on its own, harden under the downhole conditions wherein the tackifier adheres to the formation face. In some embodiments, the tackifier can harden, such as after contacting the fracture face and the proppant, such as to adhere at least some proppant particles to the fracture face. The tackifier can self-harden, or the tackifier can harden as a result of exposure to a hardening agent.

The tackifier can be any suitable material having tackiness. For example, the tackifier can be an adhesive or a resin. The term "resin" as used herein refers to any of numerous physically similar polymerized synthetics or chemically modified natural resins including thermoplastic materials and thermosetting materials. In some embodiments, the tackifier can be at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin. In some embodiments, the tackifier can be at least one of bisphenol A diglycidyl ether resin, butoxymethyl butyl glycidyl ether resin, bisphenol A-epichlorohydrin resin, and bisphenol F resin. In some embodiments, the tackifier can be at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the tackifier can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the tackifier can include an amine-containing polymer. In some embodiments, the tackifier can be hydrophobically-modified. In some embodiments, the tackifier can include at least one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer comprising monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one $C_4$-$C_{30}$ hydrocarbyl comprising at least one of a straight chain, a branched chain, an unsaturated C—C bond, an aryl group, and any combination thereof.

Examples of hydrophobically modified amine-containing polymers can include the structures given in Formulas I-III, wherein R is a hydrophobic modification as described herein:

Formula I

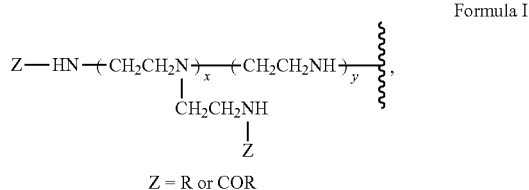

Z = R or COR

Formula II

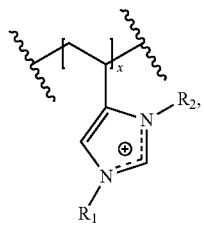

Formula III

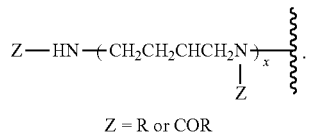

Z = R or COR

In some embodiments, the hydrophobically-modified amine-containing polymer may have a degree of modification such that the of amount hydrophobic modification ranges from a lower limit of about 0.1%, 1%, 10%, or 30% by molar ratio of amine content to an upper limit of about 99.9%, 95%, 70%, or 50% by molar ratio of amine content, and wherein the amount of hydrophobic modification may range from any lower limit to any upper limit and encompass any subset therebetween. In some embodiments, the hydrophobically-modified amine-containing polymer may have a molecular weight ranging from a lower limit of about 300 g/mol, 1,000 g/mo, 10,000 g/mol, or 100,000 g/mol to an upper limit of about 3,000,000 g/mol, 1,000,000 g/mol, or 100,000 g/mol, and wherein the molecular weight may range from any lower limit to any upper limit and encompass any subset therebetween. In some embodiments, hydrophobic modifications may be achieved via a plurality of reaction schemes including, but not limited to, amidation with carboxy terminal compounds (e.g., fatty acids), quaternization by alkyl halides, addition reactions with alpha-olefins, nucleophilic attack with alkyl compounds having active groups (e.g., a terminal epoxide), and the like, and any combination thereof.

Clay Stabilizer.

The recovery of fluids such as oil and gas from subterranean formations can be problematic in areas including water-sensitive materials such as water-swellable clays. Water-sensitive clays can also include fines capable of migrating when disturbed, such as silica, iron minerals, or alkaline earth metal carbonates. Although the clays and fines are normally stable in the formation and do not present an obstruction to the flow of hydrocarbons, when the clays and fines are contacted by aqueous fluids not indigenous to the formation and in disequilibrium with the minerals in the formation, the clays can swell and the fines can migrate. The resulting swelling and migration can block flowpaths, pores, and other passageways to the wellbore, and cause a loss in permeability of the formation. Sometimes the migrating fines are produced with the formation fluids and cause abrasion and other problems with below- or above-ground equipment. Clay stabilizers can partially or fully overcome these problems. Clay stabilizers stabilize swelling clays and migratable fines therein. For example, certain salts can adsorb to clay surfaces in a cation exchange process and can effectively reduce the swelling of the clay and migration of the fines. Various polymers and consolidating resins have also been used.

In various embodiments, the composition can include a clay stabilizer. In some embodiments, a clay stabilizer is not included. The clay stabilizer can be any suitable clay stabilizer such that the method can be carried out as described herein. The clay stabilizer can be present in any suitable concentration in the composition, such that the method can be carried out as described herein. For example, about about 0.001 wt % to about 30 wt % of the composition can be the clay stabilizer, or about 0.1 wt % to about 10 wt % of the composition, or about 0.001 wt % or less, or about 0.005 wt %, 0.01, 0.05, 0.1, 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, or about 30 wt %

In some embodiments, the clay stabilizer can be a zirconium salt, an ammonium salt, alumina, a polycationic polymer, choline chloride, tetramethyl ammonium chloride, potassium chloride, potassium bromide, potassium acetate, potassium hydroxide, sodium chloride, sodium bromide, sodium acetate, sodium hydroxide, ammonium chloride, ammonium bromide, ammonium acetate, ammonium hydroxide, calcium chloride, calcium bromide, calcium acetate, calcium hydroxide, zinc chloride, zinc bromide, zinc acetate, zinc hydroxide. The clay stabilizer can be an organic clay stabilizer. For example, the clay stabilizer can be a 1,3-substituted 2-hydroxypropane, wherein the 1- and 3-positions are independently substituted by a moiety selected from the group consisting of pyridinium, alkyl pyridinium, and $R_3N^+$-, wherein each R is independently selected from the group consisting of benzyl and $(C_1-C_{12})$alkyl optionally substituted by one hydroxy group. The clay stabilizer can be 1,3-bis(trimethylammonium chloride)-2-hydroxypropane.
Other Components.

In some embodiments, the composition includes a surfactant. The surfactant can be any suitable surfactant, such as at least one of a cationic surfactant, an anionic surfactant, and non-ionic surfactant. The surfactant can be at least one of ethoxylated nonyl phenol phosphate ester and a $C_{12}-C_{22}$ alkyl phosphonate. The surfactant can be any suitable proportion of the composition, such as about 0.001 wt % to about 10 wt % of the composition, about 0.1 wt % to about 5 wt % of the composition, or about 0.001 wt % or less, or about 0.005 wt %, 0.01, 0.05, 0.1, 0.5, 1, 1.5, 2, 2.5, 3, 3.5, 4, 4.5, 5, 6, 7, 8, 9 wt %, or about 10 wt % or more of the composition.

In one example, the surfactant is sorbitan monooletate. In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant.

Examples of suitable cationic surfactants can include, but are not limited to, quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide and corresponding salts thereof, fatty amines and fatty acid amides and their derivatives, basic pyridinium compounds, and quaternary ammonium bases of benzimidazolines and poly (ethoxylated/propoxylated)amines.

Examples of suitable anionic surfactants can include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Examples of suitable non-ionic surfactants can include, but are not limited to, condensates of ethylene oxide with long chain fatty alcohols or fatty acids such as a $(C_{12-16})$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers, alkylpolysaccharides, and polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols.

In some embodiments, the surfactant can be selected from Tergitol™ 15-s-3, Tergitol™ 15-s-40, sorbitan monooleate, polylycol-modified trimethsilylated silicate, polyglycol-modified siloxanes, polyglycol-modified silicas, ethoxylated quaternary ammonium salt, and cetyltrimethylammonium chloride.

In various embodiments, the composition includes a hardening agent. For example, the hardening agent can be a cyclo-aliphatic amine, such as piperazine, a derivative of piperazine (e.g., aminoethylpiperazine) and a modified piperazine; an aromatic amine, such as methylene dianiline, a derivative of methylene dianiline and hydrogenated forms, and 4,4'-diaminodiphenyl sulfone; an aliphatic amine, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; an amine; a polyamine; an amide; a polyamide; 2-ethyl-4-methyl imidazole; and combinations thereof. The chosen hardening agent can affect the range of temperatures over which a hardenable resin is able to cure. By way of example and not of limitation, in subterranean formations having a temperature of about 60° F. to about 250° F., amines and cyclo-aliphatic amines such as piperidine, triethylamine, tris(dimethylaminomethyl)phenol, and dimethylaminomethyl)phenol can be suitable hardening agents. In subterranean formations having higher temperatures, 4,4'-diaminodiphenyl sulfone can be suitable hardening agents. Hardening agents that comprise piperazine or a derivative of piperazine can cure various hardenable resins from temperatures as low as about 50° F. to as high as about 350° F. The hardening agent used can be included in the composition in an amount sufficient to at least partially harden the resin composition. In some embodiments of the present invention, the hardening agent used is included in the composition in the range of about 0.000.1 wt % to about 20 wt %, about 0.01% to about 15%, or about 0.000.1 wt % or less, or about 0.001, 0.01, 0.1, 1, 2, 3, 4, 5, 6, 8, 10, 12, 14, 16, 18, or about 20 wt % or more. In some embodiments, the method includes placing an afterflush liquid in the subterranean formation after placing the composition in the formation, wherein the afterflush liquid includes a hardening agent in a suitable concentration.

In some embodiments, the composition can include a silane coupling agent. In some examples, the silane coupling agent can act as a mediator to help bond the tackifier to formation particulates or proppant particulates. Examples of suitable silane coupling agents can include N-2-(aminoethyl)-3-aminopropyltrimethoxysilane, 3-glycidoxypropyltrimethoxysilane, and combinations thereof. The silane coupling agent can be included in the composition in an amount capable of sufficiently bonding the resin to the particulate. In some embodiments of the present invention, the silane coupling agent used is any suitable amount, such as about 0.000.1 wt % to about 10 wt % of the composition, or about 0.000.1 wt % to about 5 wt %, or about 0.000.1 wt % or less, or about 0.001, 0.01, 0.1, 1, 2, 3, 4, 5, 6, 7, 8, 9, or about 10 wt % or more.

In some embodiments, the composition can include a hydrolyzable ester. The hydrolyzable ester can be, for example, a mixture of dimethylglutarate, dimethyladipate, and dimethylsuccinate; dimethylthiolate; methyl salicylate; dimethyl salicylate; dimethylsuccinate; and combinations thereof. In some embodiments, the hydrolyzable ester can be used in any suitable amount, such as about 0.000.1 wt % to about 10 wt % of the composition, or about 0.000.1 wt % to about 5 wt %, or about 0.000.1 wt % or less, or about 0.001, 0.01, 0.1, 1, 2, 3, 4, 5, 6, 7, 8, 9, or about 10 wt % or more.

The composition can include a crosslinked gel or a crosslinkable gel. In some examples, the crosslinked gel or crosslinkable gel can be used to control or manage the viscosity of the composition. The crosslinked gel or crosslinkable gel can include at least one of a linear polysaccharide, and poly(($C_2$-$C_{10}$)alkenylene), wherein the ($C_2$-$C_{10}$) alkenylene is substituted or unsubstituted. The crosslinked gel or crosslinkable gel can include at least one of poly (acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly (vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, derivatized cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar. The composition can include a crosslinker; for example, a crosslinker suitable for crosslinking the crosslinkable gel. The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate. The crosslinked or crosslinkable gel can be any suitable proportion of the composition, such as about 0.01 wt % to about 50 wt % of the composition, about 10 wt % to about 30 wt % of the composition, or about 0.001 wt % or less, or about 0.01 wt %, 0.1, 1, 2, 3, 4, 5, 10, 15, 20, 25, 30, 35, 40, 45 wt %, or about 50 wt % or more of the composition. The crosslinker can be any suitable proportion of the composition, such as about 0.001 wt % to about 10 wt % of the composition, about 0.1 wt % to about 5 wt % of the composition, or about 0.001 wt % or less, or about 0.005 wt %, 0.01, 0.05, 0.1, 0.5, 1, 1.5, 2, 2.5, 3, 3.5, 4, 4.5, 5, 6, 7, 8, 9 wt %, or about 10 wt % or more of the composition.

Downhole Mixture or Composition.

The composition can be combined with any suitable downhole fluid before, during, or after the placement of the composition in the subterranean formation or the contacting of the composition and the subterranean material. In some examples, the composition is combined with a downhole fluid above the surface, and then the combined composition is placed in a subterranean formation or contacted with a subterranean material. In another example, the composition is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

In various embodiments, the method includes combining the composition with any suitable downhole fluid, such as an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. Any suitable weight percent of a mixture that is placed in the subterranean formation or contacted with the subterranean material can be the composition, such as about 0.000,000.01 wt % to 99.999.99 wt %, 0.000.1 wt %-99.9 wt %, 0.1 wt % to 99.9 wt %, or about 20 wt %-90 wt %, or about 0.000,000.01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999.9 wt %, or about 99.999.99 wt % or more of the mixture or composition.

In some embodiments, the composition can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a HTHP filtration control agent including a crosslinked copolymer; DURA-TONE® HT, a filtration control agent that includes an organophilic lignite, more particularly organophilic leonardite; THERMO TONE™, a high temperature high pressure (HTHP) filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARAC-ARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ 0 for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition can include any optional component listed in this paragraph, such as about 0.000,000.01 wt % to 99.999.99 wt %, 0.000,1-99.9 wt %, 0.1 wt % to 99.9 wt %, or about 20-90 wt %, or about 0.000,000.01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999.99 wt % or more of the composition.

System or Apparatus.

In various embodiments, the present invention provides a system. The system can be any suitable system that can be used to perform or that can be formed with the method described herein. In various embodiments, the present invention provides an apparatus. The apparatus can be any suitable apparatus that can be used to perform the method described herein.

In some embodiments, the system or apparatus can deliver one or more embodiments of the composition to a downhole location. The system can include a subterranean formation including the composition therein. The system can include a tubular disposed in a wellbore. The system can include a pump configured to pump the composition downhole.

In various embodiments, the system or apparatus can include a pump fluidly coupled to a tubular (e.g., any suitable type of oilfield pipe, such as pipeline, drill pipe, production tubing, and the like), the tubular containing an embodiment of the composition described herein. The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery downhole.

FIG. 1 shows an illustrative schematic of systems and apparatuses that can deliver embodiments of the compositions of the present invention to a downhole location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of tackifier, organic clay stabilizer, or proppant therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole equipment and tools that can come into contact with the composition during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components can be included in the systems and apparatuses generally described above and depicted in FIG. 1.

EXAMPLES

Various embodiments of the present invention can be better understood by reference to the following Examples which are offered by way of illustration. The present invention is not limited to the Examples given herein.

Aqueous-based surface modification agent (ASMA). The ASMA used was SandWedge® ABC. The ASMA is an aqueous-based solution of an agglomerating agent. The agglomerating agent is a resinous material that provides adhesion or agglomerating propensity between formation surfaces and proppant grains and does not harden or cure under reservoir conditions. When these liquid additives are applied to the fracture faces during a fracturing treatment, they form a thin, hydrophobic film on the treated surfaces and render grains tacky. The active ingredient in the agglomerating agent discussed in this paper is a polymer made from renewable resources and is environmentally acceptable. The primary ingredient is a blend of fatty acids derived from soy or pine industries, which is condensed with polyamine to form a polyamide. This polyamide is not soluble in normal well fluids or well-treating fluids, which helps provide long-lasting benefits. The macromolecule is stable and resists attack by acid and caustic, except under extreme conditions. In addition, the polymer does not contain chemical entities that change fluid properties. This characteristic is a tremendous advantage because the polymer is easily applied as a treatment fluid by injecting it as part of the pad fluid at the start of the hydraulic fracturing treatment. The polymer tends to spread on the mineral surface, with the polar backbone strongly adsorbing while the hydrophobic branch groups extend away from the polar mineral surface, appearing as bushy appendages. The bushy appendages tend to associate with one another. The polymer was designed so that the spacing between hydrophobic branches would allow them to "just fit" together, resulting in a significantly increased surface area available for association. Although sufficient force can pull molecules apart without breaking carbon-carbon bonds, these associations can reform repeatedly on contact. This process can be likened to a molecular hook-and-latch system. Rendering fracture faces tacky allows the proppant particles to adhere to the coated surfaces. The experiments performed in this study demonstrate how treating ASMA on the fracture surfaces of the split cores greatly enhances both the formation of a partial monolayer of proppant and vertical distribution of the particles, thus greatly improving the conductivity of the propped fracture.

Organic clay stabilizer (OCS). The OCS used was 1,3-bis(trimethylammonium chloride)-2-hydroxy propane. The OCS fits into and tends to partially shrink the clay structure. Because it is a poly-ionic material, it is bound to multiple sites, making it highly resistant to ion exchange, except when very high-ionic solutions are used. Because the backbone of the polymer is organic in nature and shields the charged sites, it prefers not to be hydrated, requiring a reduced volume in the interstitial clay layer space. In addition, it appears to reduce the overall water wetness of clay minerals. Laboratory testing demonstrates that this material is highly efficient as a temporary clay stabilizer and as a permanent-type stabilizer.

Example 1

Particle Size Distribution (PSD)

Table 2 provides PSD analysis for various samples of propping particulates used in this study.

TABLE 2

PSD ANALYSIS OF FINE PARTICULATES

| Fine Particulate Material | d10 (μm) | d50 (μm) | d90 (μm) |
|---|---|---|---|
| 325-mesh silica flour | 2.64 | 17.1 | 43.4 |
| Ceramic microspheres | 9.43 | 29.7 | 110 |
| 100-mesh sand | 111 | 177 | 263 |

Example 2

Split Aluminum Cylinder

Figure 2A:
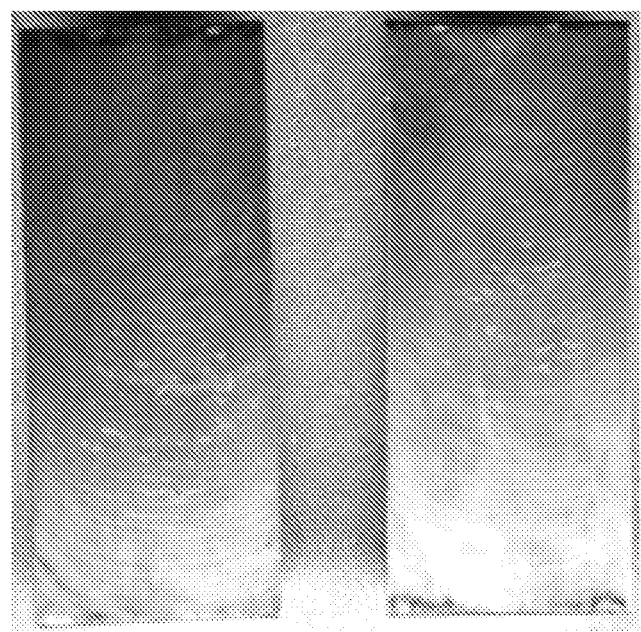

For control baseline testing, an aluminum cylinder with a 1-in. diameter and 2-in. length was cut along its axis into two halves using a saw. These two halves were machined to obtain smooth surfaces, and their axial edges were completely matched with one another to minimize any grooves formed on the side of the cylinder (FIGS. 2a-b).

Example 3

Initial Permeability of Split Aluminum Cylinder (without Treatment)

To determine initial permeability of the split aluminum cylinder, the two halves of the cylinder were carefully matched and put back together before being installed in the Hassler sleeve. The confining pressure on the cylinder was gradually increased to 1,200 psi and backpressure was set to 200 psi. Effective permeability measurements ($K_i$ values, Table 3) were determined with nitrogen gas using three different flow rates and their corresponding differential pressures, starting from the high flow rate (only lowest values shown here).

The "fracture conductivity" is generally the measurable unit for packed fractures when the crack width is not (or cannot be) measured. However, in many of the tests shown here, it is probable that the crack width is zero, at least for some (to nearly all) of the crack length, making "conductivity" an invalid representation for many of these measurements. For this reason, all data is presented here as "effective permeability," even though the term "permeability" is used for simplicity.

Example 4

Final Permeability of Split Aluminum Cylinder (Treated with Fine Particulates)

This test determines the effect of fine particulates on the permeability of the split aluminum cylinder.

The core was disassembled and the split faces of the two halves were immersed vertically in a slickwater fluid containing either 0.1 lbm/gal of 325-mesh silica flour, ceramic microspheres, or 100-mesh sand, at 140° F. for 5 min. The solution of particulates was stirred with a stirring bar at 700 rev/min to ensure the treatment fluid was in motion and to maintain particulates in suspension. This solution was prepared in an aqueous-based fluid containing 2% (v/v) OCS and 5 lbm/Mgal of gelling agent. After the immersion periods in the solution of ASMA solution and particulates, the treated halves were then reassembled with their faces aligned for core flow testing with nitrogen gas under the same closure stress and backpressure as applied in the initial permeability flow testing (the outside of the reassembled cylinder was wiped clean of any particulates). Table 3 shows the permeability measurements ($K_f$ values) of the split cylinder after the treatment of particulates.

Example 5

Final Permeability of Split Aluminum Cylinder (Treated with ASMA and Particulates)

Example 5a

One-Stage Treatment

Both ASMA and particulates were combined into a single solution to treat the split faces of the aluminum cylinder.

The core was disassembled and the split faces of the two halves were immersed vertically in a 0.5% (v/v) ASMA solution containing 0.1 lbm/gal of 325-mesh silica flour, ceramic microspheres, or 100-mesh sand, at 140° F. for 5 min. The solution of ASMA and particulates was stirred with a stirring bar at 700 rev/min to ensure the treatment fluid was in motion and to maintain particulates in suspension. This solution was prepared in an aqueous-based fluid containing 2% (v/v) OCS and 5 lbs/Mgal of gelling agent.

After the immersion periods in the solution of ASMA solution and particulates, the treated halves were then reassembled with their faces aligned together for core flow testing with nitrogen gas under the same closure stress and backpressure as applied in the initial permeability flow testing (the outside of the reassembled cylinder was wiped clean of any particulates). Table 3 shows the permeability measurements of the split cylinder after the treatment of ASMA and particulates. After treating with the solution of ASMA and particulates, the permeability of the split aluminum cylinder was shown to increase multiple folds compared to the permeability of the untreated, split aluminum cylinder.

Example 5b

Two-Stage Treatment

The split faces of the aluminum cylinder were first treated with ASMA solution, followed by exposure to the sand slurry.

The cylinder was disassembled and the split faces of the two halves were immersed vertically in a 5% (v/v) ASMA solution at 140° F. for 10 min. After being removed from the ASMA solution, they were immediately immersed, also vertically, for 20 min in a 100-mesh sand slurry at 140° F., with a sand concentration of 0.5 lbm/gal. Both the ASMA solution and sand slurry were stirred with a stirring bar at 700 rev/min to ensure the treatment fluid was in motion and to maintain sand particulates in suspension. Both the ASMA solution and the sand slurry were prepared in an aqueous-based fluid containing an OCS and a gelling agent to provide functions of clay stabilization and friction reducer, respectively.

After the immersion periods in the ASMA solution and then sand slurry, the treated halves were then reassembled with their faces aligned together for core flow testing with nitrogen gas under the same closure stress and backpressure as applied in the initial permeability flow testing (the outside of the reassembled cylinder was wiped clean of any sand grains). Table 3 shows the permeability measurements of the split cylinder after the treatments of ASMA solution and sand slurry.

TABLE 3

EFFECT OF ASMA AND PARTICULATES ON
PERMEABILITY OF SPLIT ALUMINUM CYLINDER

| Fine Particulate Material | With Particulates Only | | Treatment Type | With Both ASMA and Particulates | |
|---|---|---|---|---|---|
| | $K_i$ (mD) | $K_f$ (mD) | | $K_i$ (mD) | $K_f$ (mD) |
| 325-mesh silica flour | 0.94 | 2.4 | One-stage | 0.91 | 12 |
| Ceramic microspheres | 0.94 | 3.1 | One-stage | 0.45 | 60 |
| 100-mesh sand | 0.94 | 2.0 | One-stage | 0.94 | 1,304 |
| 100-mesh sand | NT | NT | Two-stage | 4 | >3,000 |

NT = not tested.

Example 6

Permeability of Non-Split Shale Cores

The non-split shale cores were subjected to core flow testing with nitrogen gas to determine their non-split permeabilities. The core was installed in a Hassler sleeve. The confining pressure on the core was gradually increased to 1,200 psi, and backpressure was set to 200 psi. Permeability measurements were determined with three different flow rates and their corresponding differential pressures by starting from the high flow rate. Table 4 shows the permeabilities of the non-split cores for shale materials.

TABLE 4

PERMEABILITY OF NON-SPLIT SHALE
CORES AT 1,200-PSI CONFINEMENT

| Core Material | Non-split Permeability (md) |
|---|---|
| Core 1 | 0.020 |
| Core 2 | 0.013 |

Example 7

Preparation of Split Shale Cores

Figure 3B:
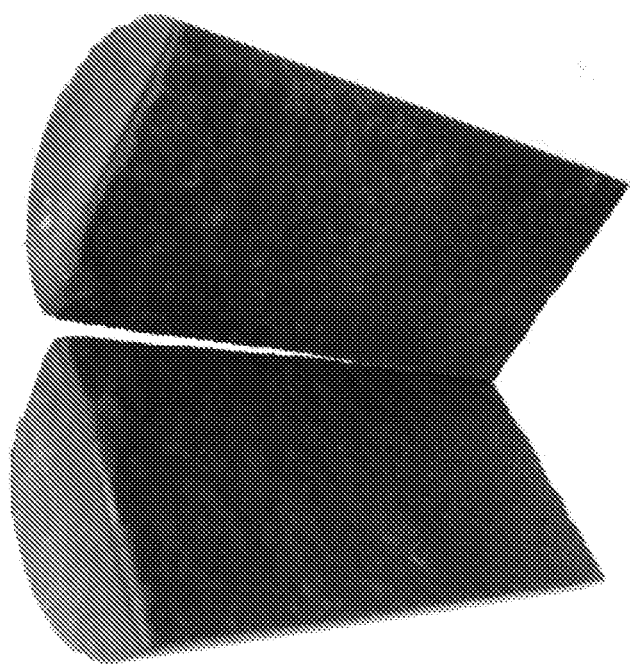
FIGS. 3a-b illustrate two surfaces of a split shale core, in accordance with various embodiments.
Figure 3A:
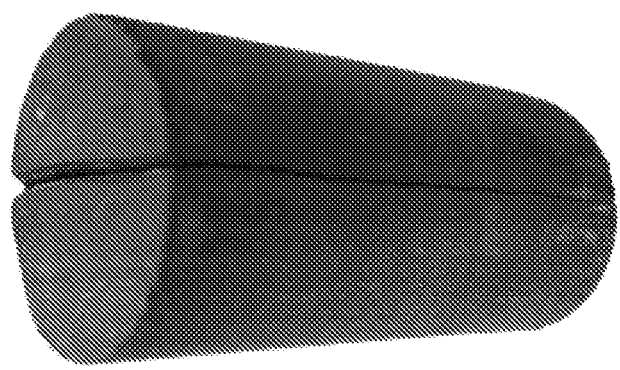

Cores with a 1-in. diameter and 2-in. length were obtained from outcroppings of shale formations. The dimensions and mass of the cores were recorded. The fracture plane on the core was visually determined A Dremel® tool was used to score and form an indentation on the top of the core. A wide-blade chisel and hammer were used to carefully split the core on the plane along its axial length into two halves (FIGS. 3a-b).

Example 8

X-Ray Diffraction (XRD) Analysis

A small sample from the same split core that was subjected to core flow tests was obtained for XRD analysis. Table 1 provides a detail of mineral compositions for a shale core sample.

TABLE 1

MINERAL COMPOSITION
OF A SHALE CORE

| Mineral | | Composition (%) |
|---|---|---|
| Quartz | $SiO_2$ | 50 |
| Na-feldspar | $NaAlSi_3O_8$ | 5 |
| Calcite | $CaCO_3$ | 34 |
| Pyrite | $FeS_2$ | 1 |
| Chlorite clay | — | 2 |
| Muscovite/Illite | — | 8 |

Example 9a

Initial Permeability of Split Shale Cores (without Treatment)

The two halves of each core were immersed in a brine fluid containing an OCS; they were then carefully matched, put back together, and installed in the Hassler sleeve to determine initial permeability of the split core. The confining pressure on the core was gradually increased to 1,200 psi and backpressure was set to 200 psi. Permeability measurements ($K_i$ values, Table 5) were determined with nitrogen gas at three different flow rates and their corresponding differential pressures by starting from the high flow rate.

TABLE 5

EFFECT OF ASMA AND FINE PARTICULATES ON
PERMEABILITY OF SPLIT SHALE CORES

| Fine Particulate Material | With Particulates Only | | Treatment Type | With Both ASMA and Particulates | |
|---|---|---|---|---|---|
| | $K_i$ (mD) | $K_f$ (mD) | | $K_i$ (mD) | $K_f$ (mD) |
| 325-mesh silica flour | NT | NT | One-stage | 7.9 | 18.1 |
| Ceramic microspheres | NT | NT | One-stage | 3.2 | 31.3 |
| 100-mesh sand | 2 | 17 | One-stage | 8.9 | 1,832 |
| 100-mesh sand | 5 | 25 | Two-stage | 12 | 304 |
| 100-mesh sand | NT | NT | Two-stage | 14 | 1,708 |

NT = not tested.

Example 9b

Initial Permeability of Split Shale Cores (without Treatment)

Figure 4:
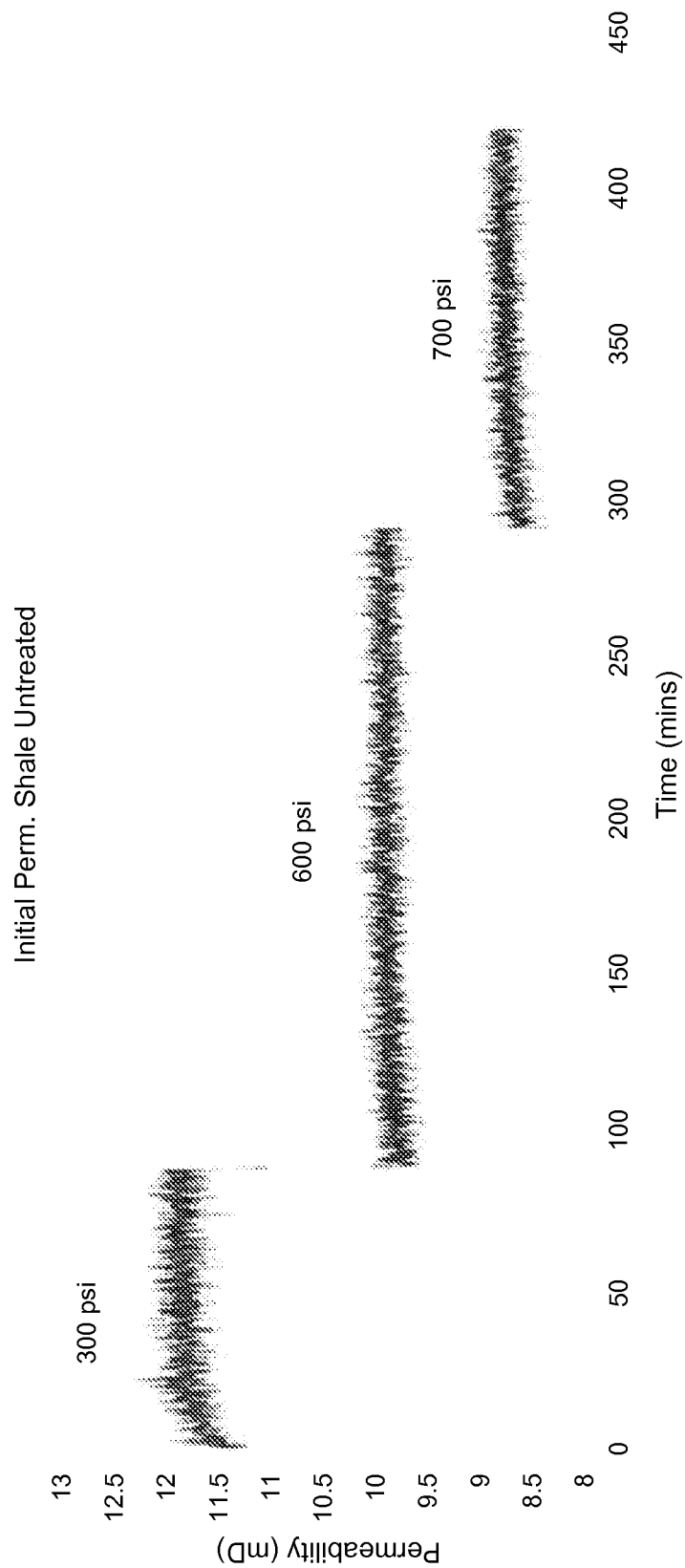
FIG. 4 illustrates the permeability versus time measurements at various pressures for an untreated split shale core, in accordance with various embodiments.

The two halves of each core were immersed in an aqueous fluid containing 2% OCS before they were carefully matched up and put back together before being installed in the Hassler sleeve to determine initial permeability of the split core. The confining pressure on the core was gradually increased to 1,200 psi and a backpressure was set at 200 psi. Permeability measurements (FIG. 4) were determined with nitrogen gas at three different flow rates and their corresponding differential pressures by starting from the high flow rate.

Example 10

Final Permeability of Split Shale Core (Treated with Fine Particulates)

This test determines the effect fine particulates had on the permeability of the split shale core.

The core was disassembled and the split faces of the two halves were immersed vertically in a slickwater fluid containing 0.5 lbm/gal of 100-mesh sand, at 140° F. for 5 min. The solution of particulates was stirred with a stirring bar at 700 rev/min to ensure the treatment fluid was in motion and to maintain particulates in suspension. This solution was prepared in an aqueous-based fluid containing 2% (v/v) OCS and 5 lbm/Mgal of gelling agent. After the immersion periods in the solution of ASMA solution and particulates, the treated halves were then reassembled with their faces aligned together for core flow testing with nitrogen gas under the same closure stress and backpressure as applied in the initial permeability flow testing (the outside of the reassembled cylinder was wiped clean of any particulates). Table 5 shows the permeability measurements ($K_f$ values) of the split shale core after the treatment of particulates.

Example 11

Final Permeability of Split Shale Cores (Treated with ASMA and Fine Particulates)

Example 11a

One-Stage Treatment

Both ASMA and particulates were combined into a single solution to treat the split faces of shale core.

The shale core was disassembled and the split faces of the two halves were immersed vertically in a 0.5% (v/v) ASMA solution containing 0.1 lbm/gal of 325-mesh silica flour, ceramic microspheres, or 100-mesh sand, at 140° F. for 5 min. The solution of ASMA and particulates was stirred with a stirring bar at 700 rev/min to ensure the treatment fluid was in motion and to maintain particulates in suspension. This solution was prepared in an aqueous-based fluid containing 2% (v/v) OCS and 5 lbm/Mgal of gelling agent to provide functions of clay stabilization and friction reducer, respectively.

After the immersion periods in the solution of ASMA solution and particulates, the treated halves were then reassembled with their faces aligned for core flow testing with nitrogen gas under the same closure stress and backpressure as applied in the initial permeability flow testing (the outside of the re-assembled cylinder was wiped clean of any particulates). Table 5 shows the permeability measurements ($K_f$ values) of the split core after the treatment of ASMA and particulates. After treating with the solution of ASMA and particulates, the permeability of the treated split shale was shown to increase multiple folds compared to the permeability of the untreated, split shale core.

Example 11b

One-Stage Treatment

Figure 5:
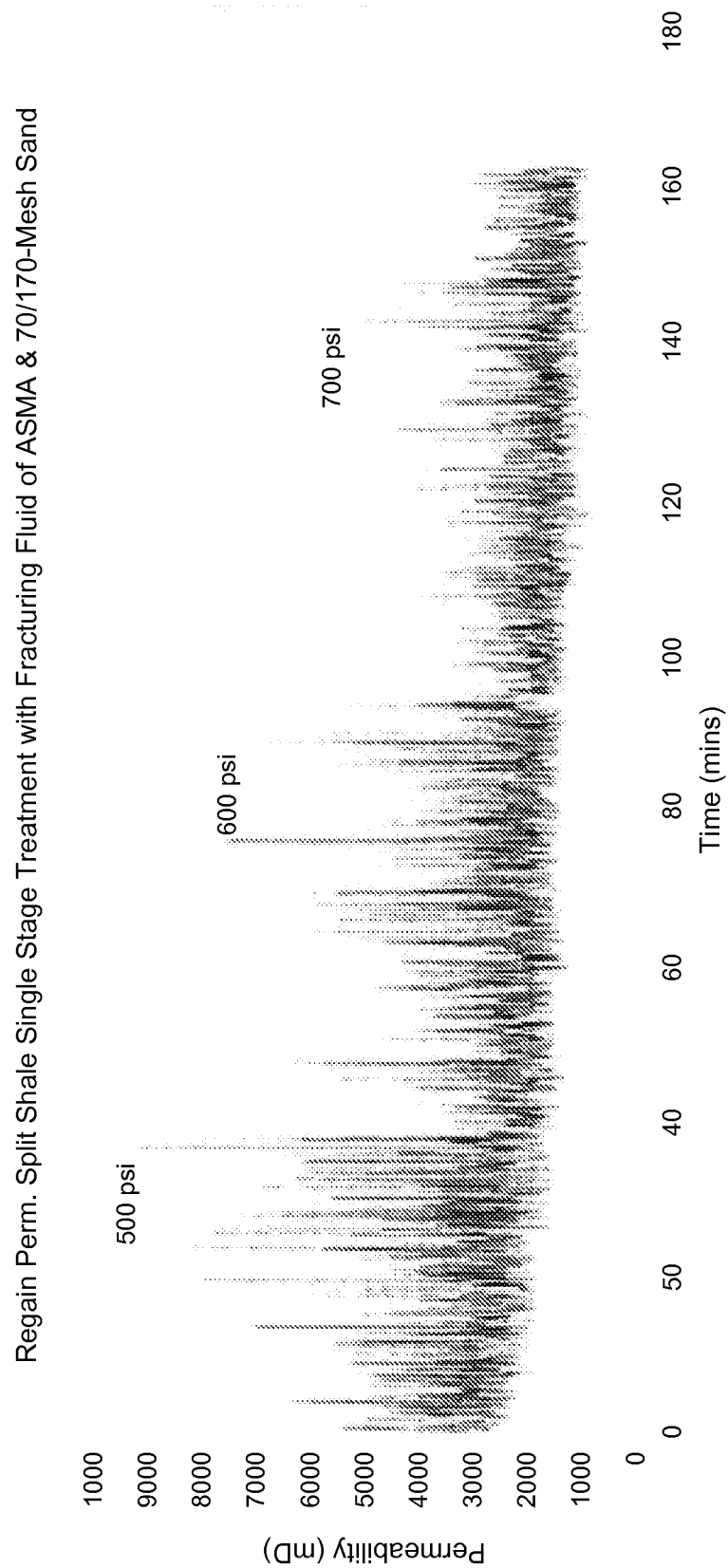
FIG. 5 illustrates permeability versus time for a split shale core at various pressures after the fracture faces were treated with a single-stage fracturing fluid containing an aqueous-based surface modification agent and 70/170-mesh sand, in accordance with various embodiments.
Figure 6:
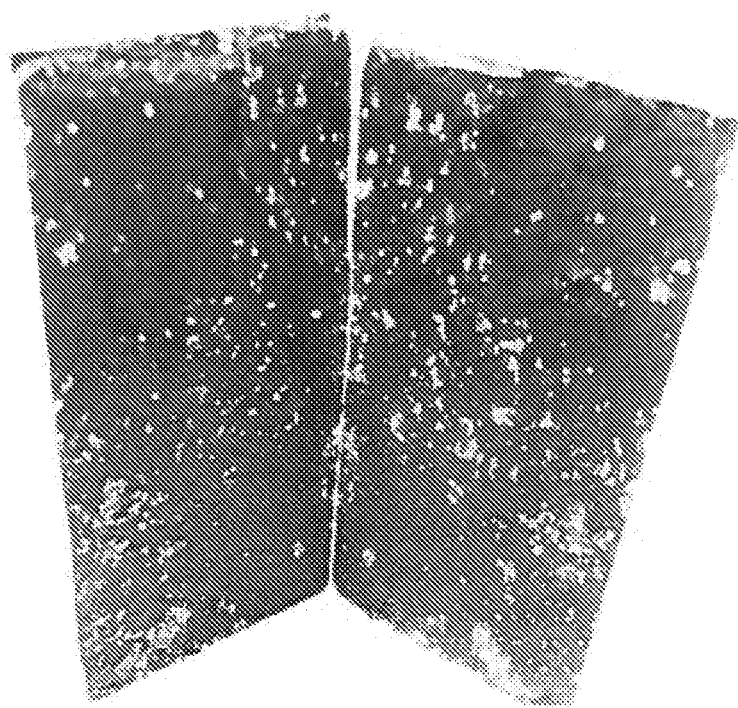
FIG. 6 illustrates the treated fracture faces of a split shale core after regain-permeability testing, in accordance with various embodiments.

To determine the impact of treatment with a proppant fluid, the core was disassembled and the fracture faces of the two halves were immersed vertically, in a beaker containing the proppant fluid comprising an aqueous fluid having 2% v/v OCS, 2% v/v ASMA, and 0.2 lbm/gal of 70/170-mesh sand. The proppant fluid was stirred with a stirring bar at 700 rpm. After 15 minutes of immersion in the proppant fluid, the treated halves were then reassembled with their surfaces aligned together for core flow testing under the same closure stress and backpressure as applied for the non-proppant permeability flow testing as above. FIG. 5 shows the permeability measurements of the split core after being treated with the proppant fluid. FIG. 6 illustrates the treated fracture faces of a split shale core after regain-permeability testing.

Example 11c

Two-Stage Treatment

The split faces of shale core were first treated with ASMA solution, followed by exposure to the sand slurry.

To determine the impact of treatment with an ASMA solution and propping agent, the core was disassembled and the fracture faces of the two halves were immersed vertically in a 5% (v/v) ASMA solution at 140° F. for 10 min. After being removed from the ASMA solution, they were immediately immersed, also vertically, for 20 min in a 100-mesh sand slurry at 140° F., with a sand concentration of 0.5 lbm/gal. Both the ASMA solution and sand slurry were stirred with a stirring bar at 700 rev/min. Both the ASMA solution and the sand slurry were prepared in an aqueous-based fluid containing an OCS and a gelling agent to provide functions of clay stabilization and friction reducer, respectively.

After the immersion periods in the ASMA solution and sand slurry, the treated halves were then reassembled with their surfaces aligned for core flow testing under the same closure stress and backpressure as applied for the initial permeability flow testing. Table 5 shows the permeability measurements of the fractured cores before and after treatments of ASMA solution and proppant slurry or with and without ASMA treatment.

Example 12

Environmental Scanning Electron Microscopy (ESEM) Evaluation

ESEM microscopy was used to capture the images of split-core surfaces and the proppant grains adhering to these surfaces after the cores were subjected to core flow testing under closure stress.

Example 12a

Split Aluminum Cylinder

Figure 7B:
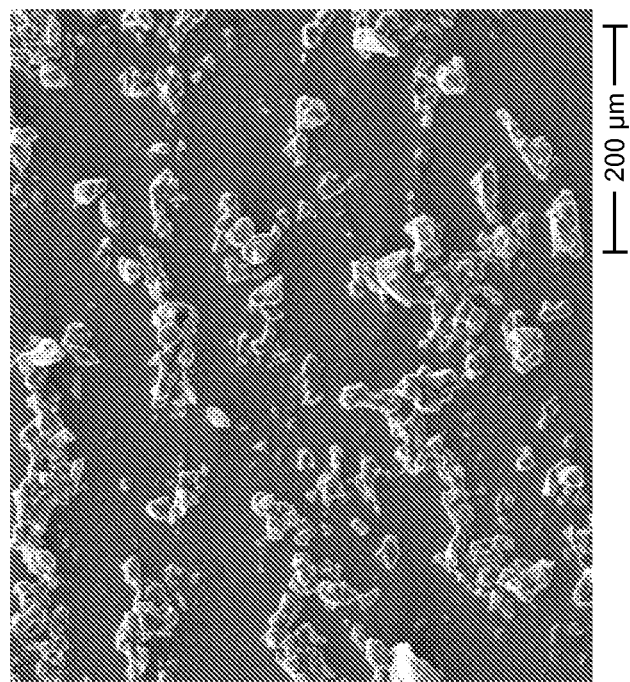
FIGS. 7a-b illustrate 100× and 200× magnification images, respectively, of surfaces of a split aluminum cylinder after immersion in solution containing aqueous-based surface modification agent (ASMA) and 325-mesh silica flour and after core flow test with 1,200-psi stress load applied on the split cylinder during flow test, in accordance with various embodiments.
Figure 7A:
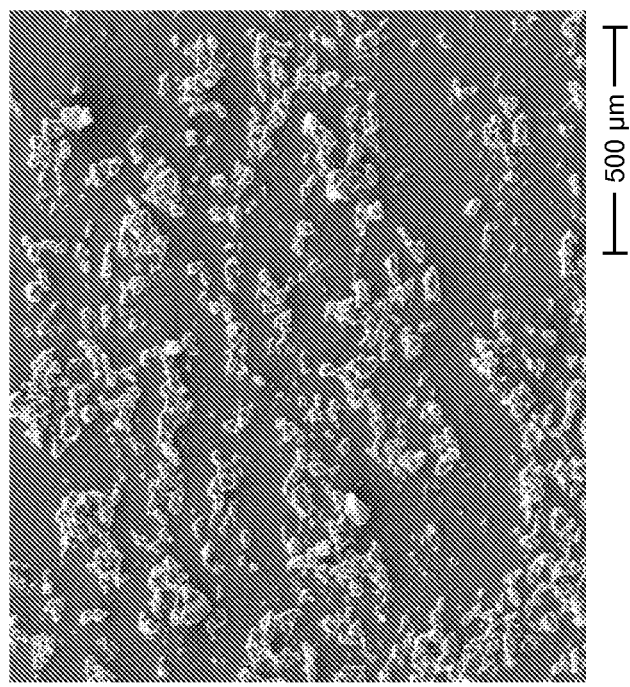
Figure 8B:
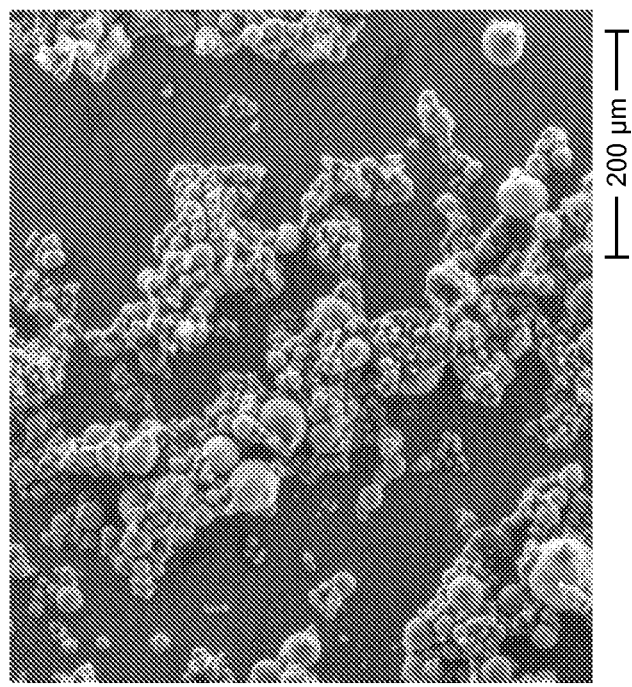
FIGS. 8a-b illustrate 100× and 200× magnification images, respectively, of surfaces of a split aluminum cylinder after immersion in solution containing ASMA and ceramic microspheres and after core flow test with 1,200-psi stress load applied on the split cylinder during flow test, in accordance with various embodiments.
Figure 8A:
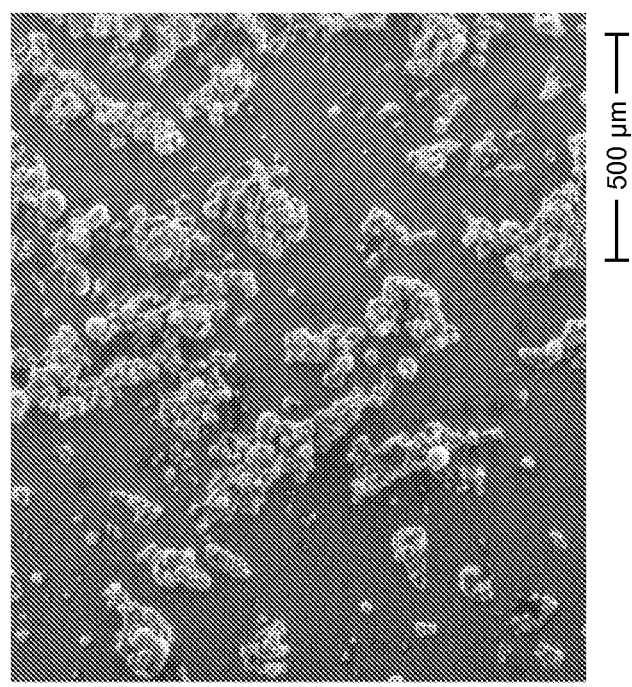
Figure 9B:
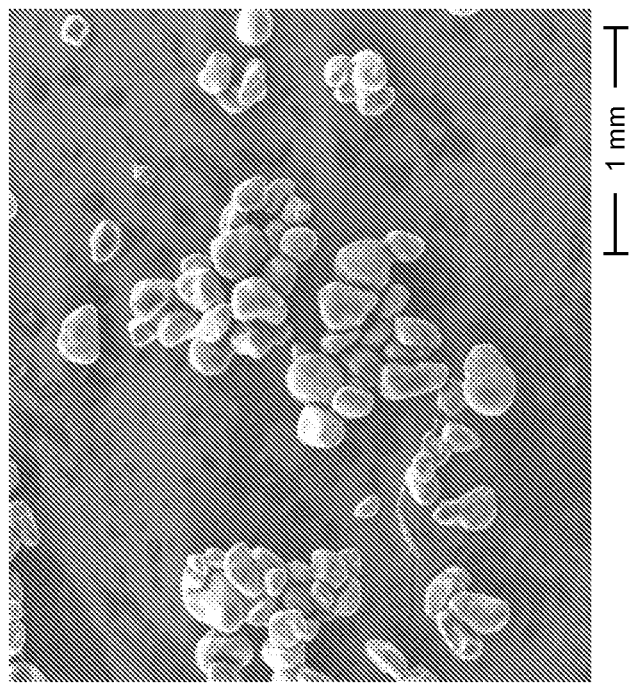
FIGS. 9a-b illustrate 50× magnification images of surfaces of the left face and the right face, respectively, of a split aluminum cylinder after a one-stage treatment, with immersion in solution containing ASMA and 100-mesh sand and after core flow test with 1,200-psi stress load applied on the split cylinder during flow test, in accordance with various embodiments.
Figure 9A:
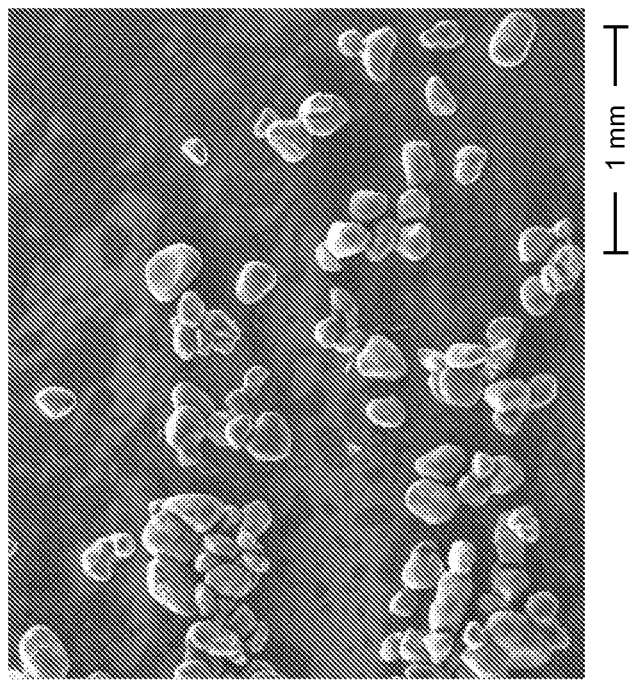
Figure 10B:
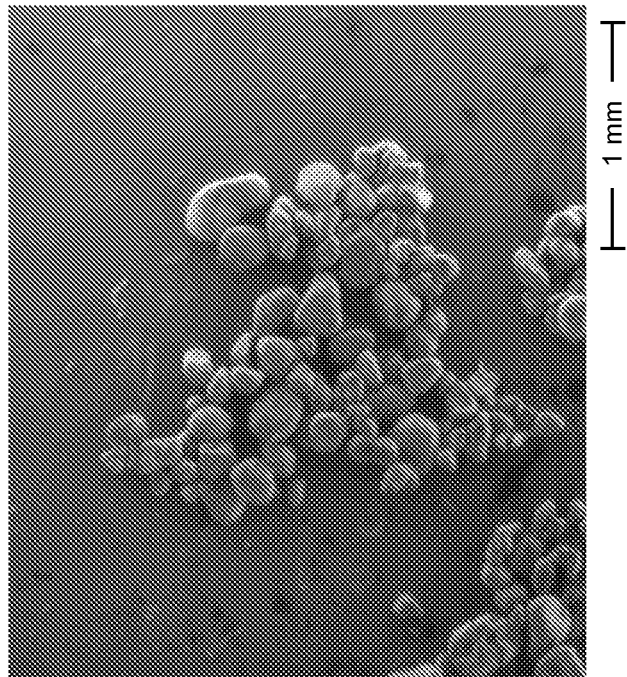
FIGS. 10a-b illustrate 50× magnification images of the surface of left and right faces, respectively, of a split aluminum cylinder after a two-stage treatment, with immersion in ASMA solution and then in 100-mesh sand slurry and after core flow test with 1,000-psi stress load applied on the split cylinder during flow test, in accordance with various embodiments.
Figure 10A:
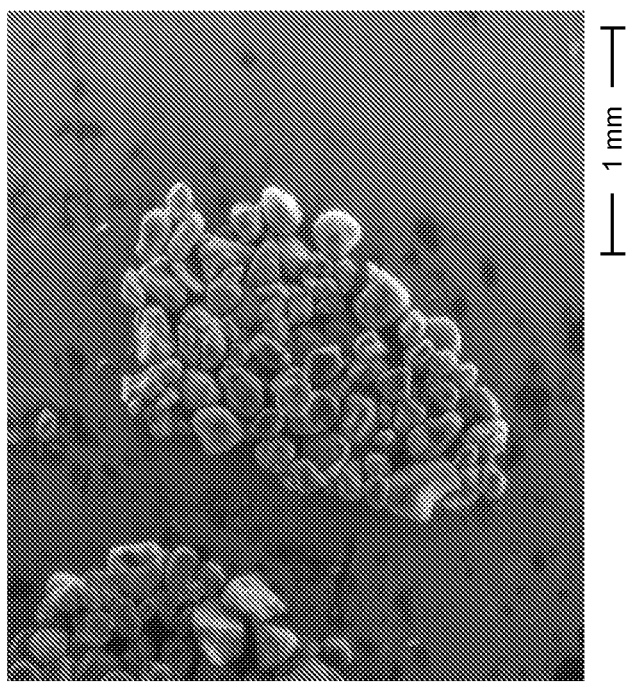

In the split aluminum cylinder, clusters or aggregates of particulates were found to adhere to the split faces, forming a partial monolayer and surrounded by the proppant-free channels. FIGS. 7a and 7b show a split aluminum cylinder after immersion in solution containing ASMA and 325-mesh silica flour and after core flow test with 1,200-psi stress load applied on the split cylinder during flow test; images are at 100× and 200× magnification, respectively. FIGS. 8a-b illustrate surfaces of a split aluminum cylinder after immersion in solution containing ASMA and ceramic microspheres and after core flow test with 1,200-psi stress load applied on the split cylinder during flow test; images are at 100× and 200× magnification, respectively. FIGS. 9a-b illustrate surfaces of a split aluminum cylinder after a one-stage treatment, with immersion in solution containing ASMA and 100-mesh sand and after core flow test with 1,200-psi stress load applied on the split cylinder during flow test; (a) left face, (b) right face; images are at 50× magnification. FIGS. 10a-b illustrate surfaces of a split aluminum cylinder after a two-stage treatment, with immersion in ASMA solution and then in 100-mesh sand slurry and after core flow test with 1,000-psi stress load applied on the split cylinder during flow test; (a) left face, (b) right face; images are at 50× magnification.

Example 12b

Split Shale Core

For the split shale core, clusters or aggregates of particulates were found to adhere to the split faces, forming a partial monolayer and surrounded by the proppant-free channels.

Figure 11B:
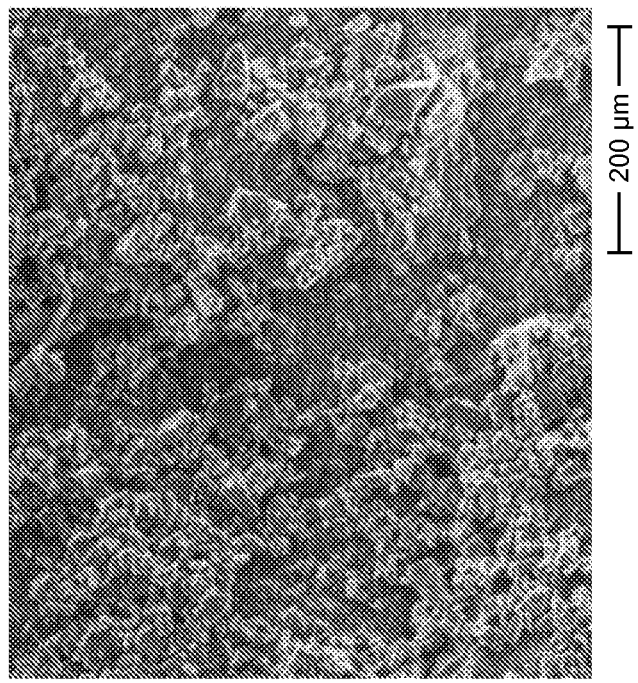
FIGS. 11a-b illustrate 100× and 200× magnification images, respectively, of fracture faces of shale core after a one-stage treatment, with immersion in solution containing ASMA and 325-mesh silica flour and after core flow test with 1,200-psi stress load applied on the split core during flow test, in accordance with various embodiments.
Figure 11A:
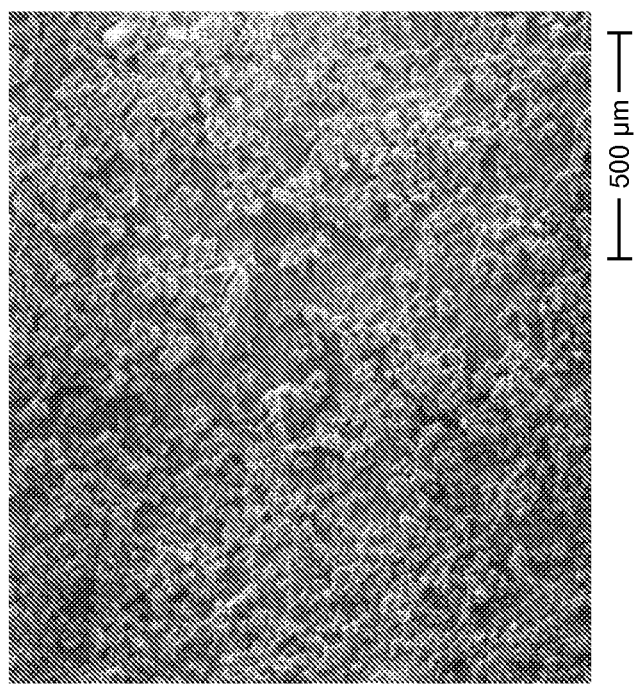
Figure 12B:
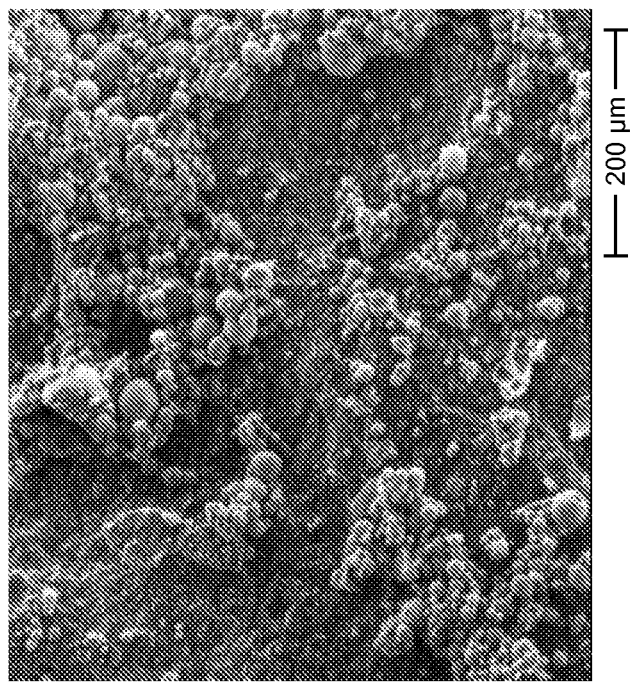
FIGS. 12a-b illustrate 100× and 200× magnification images, respectively, of fracture faces of shale core after a one-stage treatment, with immersion in solution containing ASMA and ceramic microspheres and after core flow test with 1,200-psi stress load applied on the split core during flow test, in accordance with various embodiments.
Figure 12A:
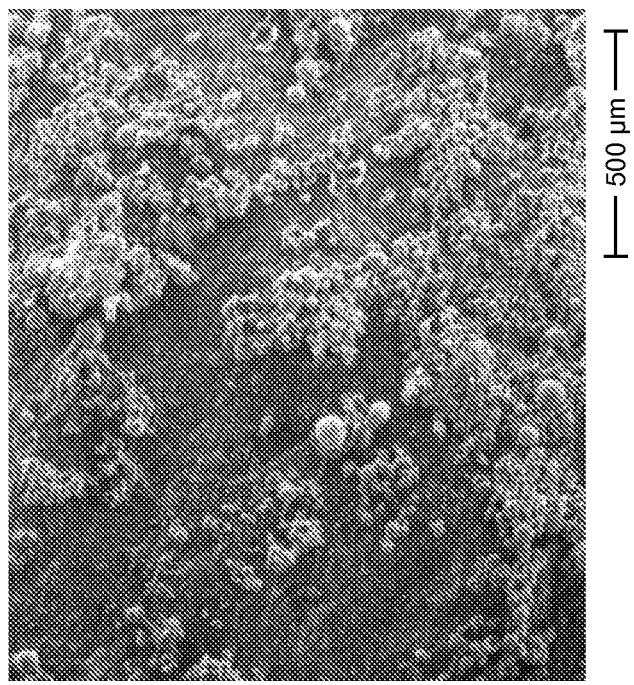
Figure 13B:
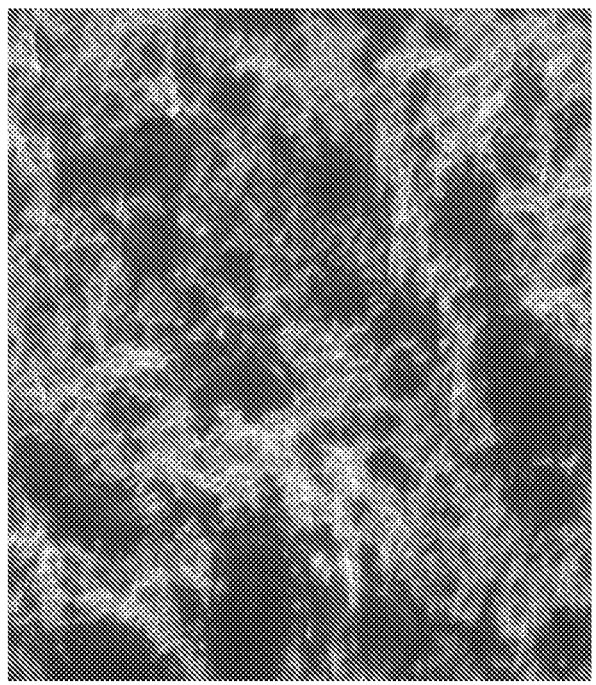
FIGS. 13a-b illustrate 50× magnification images of fracture faces of shale core (a) before and (b) after immersion in solution containing ASMA, in accordance with various embodiments.
Figure 13A:
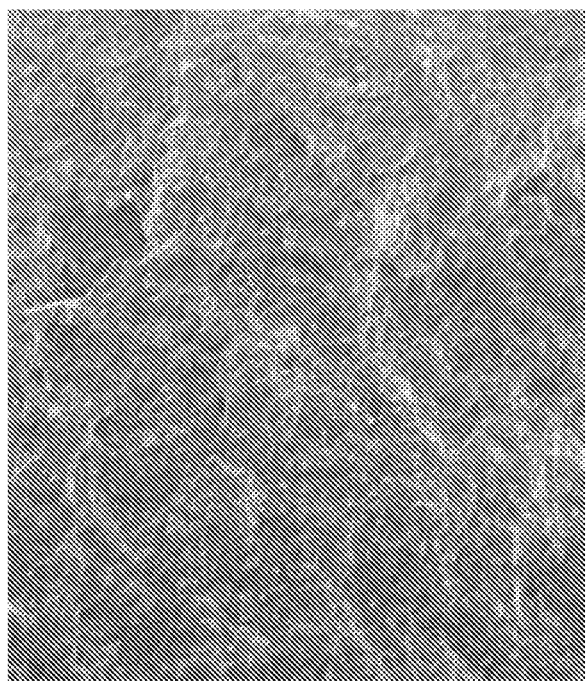
Figure 14B:
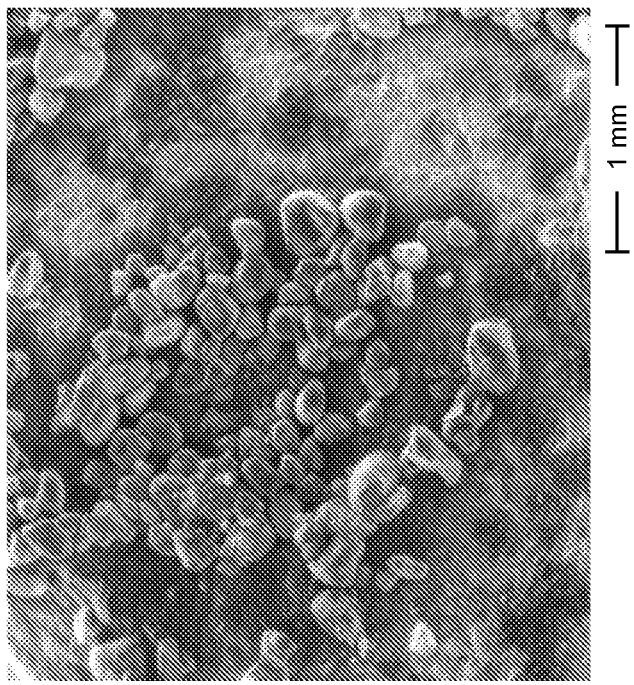
FIGS. 14a-b illustrate 50× magnification images of the left face and right face, respectively, of fracture faces of split shale core after immersion in ASMA solution and in 100-mesh sand slurry and after core flow tests; stress loads of 1,000, 2,000, and 3,000 psi were applied sequentially on the treated split core during flow tests, in accordance with various embodiments.
Figure 14A:
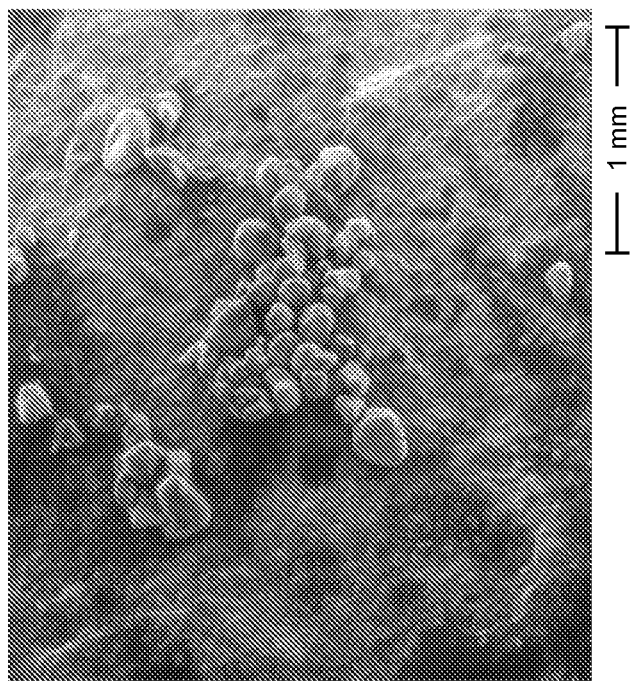

FIGS. 11a-b illustrate facture faces of shale core after a one-stage treatment, with immersion in solution containing ASMA and 325-mesh silica flour and after core flow test with 1,200-psi stress load applied on the split core during flow test; images are at 100× and 200× magnification, respectively. FIGS. 12a-b illustrate fracture faces of shale core after a one-stage treatment, with immersion in solution containing ASMA and ceramic microspheres and after core flow test with 1,200-psi stress load applied on the split core during flow test; images are at 100× and 200× magnification, respectively. FIGS. 13a-b illustrate fracture faces of a shale core (a) before and (b) after immersion in solution containing ASMA; images are at 50× magnification. FIGS. 14a-b illustrate fracture faces of split shale core after immersion in ASMA solution and in 100-mesh sand slurry and after core flow tests; stress loads of 1,000, 2,000, and 3,000 psi were applied sequentially on the treated split core during flow tests; (a) left face, (b) right face; images are at 50× magnification.

Example 13

Discussion of Examples 1-12

The generation of microfractures in tight reservoir formations dramatically increases effective fracture permeability, even without placement of propping particulates in the fractures (e.g., unpropped fractures (Tables 4 and 5)). The experimental results obtained from this study demonstrate the potential benefits, in terms of significant increase to fracture permeability, that could be gained with new treatment methods and placement of fine particulates or microproppant materials into the microfractures compared to the permeability of unpropped fractures (Tables 3 and 5).

To minimize the effect of high stress loads on the split core permeability that might have had a major impact on proppant crushing and proppant embedment, stress loads were applied that were much lower than the closure stresses often observed in actual wells.

A split aluminum cylinder was used in this study to provide a control baseline, in which the effects of having grooves or bumps (which are naturally found on fracture faces of core materials) or the impact of embedment resulting from core properties (e.g., consolidation strength, mineral composition, etc.) were not considered. This allowed examination of just the contribution of fine particulates, with and without ASMA, their forming of particulate clusters, or partial monolayer of particulates on the split cylinder permeabilities (Table 3, FIGS. 5 through 10).

For the purpose of comparing flow capability through the core, with and without forming a crack, the total effective permeability of the core is determined, realizing that, once the crack is formed, almost all of the fluid flows through it. This paper uses the core's effective permeability to simply show the improved relationship between the permeabilities before and after the split or with and without treatment of ASMA and/or particulate slurry.

It was observed that, without ASMA, fine particulates had no preference to adhere to the split faces. They tended to settle when the stirring was stopped, allowing very few particulates to remain on the split surfaces. Core flow testing of split aluminum cylinder or shale core that was treated only with fine-particulate resulted in much lower permeability compared to the permeabilities of the cases when ASMA was mixed with fine particulates (e.g., one-stage treatment), or when ASMA was pretreated on the split faces before being exposed to particulate slurry (e.g., two-stage treatment). The split cores that were treated with both the ASMA solution and proppant slurry had permeability increases of multiple folds compared to those of unpropped, split cores and those treated with proppant only (Tables 3 and 5). These increases are a direct result of vertical distribution enhancement of proppant within the split fracture. The ASMA provides thin tacky-film patches that randomly distribute on the split faces, allowing the particulates or their clusters to adhere to these surfaces (FIGS. 11a-b). Instead of forming a densely packed monolayer on the split surface, particulate grains were found adhered to the treated face individually or in groups of several grains, and they distributed randomly throughout the treated surfaces. This ability of forming partial monolayer on the treated faces of split cores was well supported by the permeability results and SEM micrographs (Table 5, FIGS. 11a-b, 12a-b, and 14a-b).

Instead of injecting the untreated fine particulates in which the particulates remain as individual grains, the inclusion of a low concentration of an ASMA in the carrier fluid combined with the fine particulates allows the fine particulates to form small clusters, each with a few particulates. These fine-particulate clusters can still be deformed or detached under low shear stress, allowing them to enter the microfractures without screening out at the entrances. The existence of clusters enhances the forming of partial monolayer of particulates; and, in most cases, these clusters formed mini-pillars, supporting the closure of the fracture.

In actual hydraulic fracturing treatments, a low concentration of fine particulates, such as silica flour or ceramic microspheres, combined with a low concentration of ASMA, should to be pumped as the pad fluid in the hydraulic fracturing treatment performed in the tight formations because this first pad fluid exposes and delivers the fine particulates to the microfractures that are often located far from the wellbore. Following this pad fluid, a low-concentration ASMA solution is pumped such that a thin tacky film is formed on the created faces of the main fractures and their large branches. As the proppant slurry of 100- or 40/70-mesh sand enters the fracture, proppant grains will randomly adhere to the treated fracture faces, keeping these large fracture branches wide open to accommodate all the production.

Because only one layer of proppant grains can adhere to a treated fracture surface (e.g., in cases of the most efficient packing), the probability for the proppant to form multiple layers on the fracture faces is negligible. Strong evidence from other studies has shown that the majority of fracturing sand injected into the fracture with slickwater has the tendency to settle to the lower part of the fracture. Therefore, by treating the fracture faces with a tacky film, only a partial monolayer of proppant most likely is generated in the upper part of the fracture as it closes.

To address the concerns of large buildup of proppant at the entrance of fracture that can cause near-wellbore (NWB) premature screenout, the fracture faces are treated with a thin film of ASMA, such that only a monolayer of proppant will be formed or adhered to the coated fracture faces, at best. Furthermore, the drag force of flowing fluid continues pushing or pulling the proppant grains, especially those not adhering to the treated fracture faces, farther down the fracture, away from the wellbore.

General observations from the examples include that ASMA treatment promotes adhesion of proppant onto the treated fracture faces such that vertical distribution of proppant is enhanced and partial monolayer of proppant can be formed, thus increasing the effective permeability of the propped fracture. Also, a combination of low-concentration ASMA and fine particulates allows formation of small particulate clusters to greatly enhance the permeability performance of the treated split cores.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

obtaining or providing a composition comprising a tackifier and having a viscosity of less than about 20 cP at standard temperature and pressure; placing the composition in a subterranean formation downhole; and fracturing the subterranean formation with the composition.

Embodiment 2 provides the method of Embodiment 1, wherein the composition is a fracturing fluid.

Embodiment 3 provides the method of any one of Embodiments 1-2, wherein the viscosity of the composition is about 0.001 cP to about 20 cP.

Embodiment 4 provides the method of any one of Embodiments 1-3, wherein the viscosity of the composition is about 0.1 cP to about 15 cP.

Embodiment 5 provides the method of any one of Embodiments 1-4, wherein the tackifier contacts a face of at least one fracture generated by the fracturing.

Embodiment 6 provides the method of any one of Embodiments 1-5, wherein the tackifier substantially coats a face of at least one fracture generated by the fracturing.

Embodiment 7 provides the method of any one of Embodiments 1-6, further comprising placing a proppant in the subterranean formation prior to placing the composition in the subterranean formation.

Embodiment 8 provides the method of any one of Embodiments 1-7, further comprising placing a proppant in the subterranean formation after placing the composition in the subterranean formation.

Embodiment 9 provides the method of any one of Embodiments 1-8, wherein the composition further comprises a proppant.

Embodiment 10 provides the method of Embodiment 9, wherein about 0.001 wt % to about 5 wt % of the composition is the proppant.

Embodiment 11 provides the method of any one of Embodiments 9-10, wherein about 0.1 wt % to about 2 wt % of the composition is the proppant.

Embodiment 12 provides the method of any one of Embodiments 9-11, wherein the proppant has a particle size of about 150 mesh or a smaller particle size.

Embodiment 13 provides the method of any one of Embodiments 9-12, wherein the proppant has a particle size of about 150 mesh to about 1000 mesh.

Embodiment 14 provides the method of any one of Embodiments 9-13, wherein the proppant has a particle size of about 150 mesh to about 400 mesh.

Embodiment 15 provides the method of any one of Embodiments 9-14, further comprising substantially coating with the composition at least part of a face of at least one fracture formed by the fracturing.

Embodiment 16 provides the method of Embodiment 15, wherein the coating of the face of the at least one fracture comprises forming at least one adhered layer of proppant on the face.

Embodiment 17 provides the method of any one of Embodiments 9-16, further comprising substantially coating at least some of the proppant with the tackifier.

Embodiment 18 provides the method of Embodiment 17, wherein the coating of the proppant is sufficient to adhere proppant particles to one another and form clusters or aggregates of proppant particles.

Embodiment 19 provides the method of any one of Embodiments 1-18, wherein the obtaining or providing of the composition occurs above-surface.

Embodiment 20 provides the method of any one of Embodiments 1-19, wherein the obtaining or providing of the composition occurs downhole.

Embodiment 21 provides the method of any one of Embodiments 1-20, wherein the composition is aqueous.

Embodiment 22 provides the method of any one of Embodiments 1-21, wherein about 0.001 wt % to about 99.999 wt % of the composition is water.

Embodiment 23 provides the method of any one of Embodiments 1-22, wherein about 50 wt % to about 99 wt % of the composition is water.

Embodiment 24 provides the method of any one of Embodiments 1-23, wherein the composition is a water-external emulsion.

Embodiment 25 provides the method of any one of Embodiments 1-24, wherein the composition is an oil-external emulsion.

Embodiment 26 provides the method of any one of Embodiments 1-25, wherein about 0.001 wt % to about 99.999 wt % of the composition is at least one of oil and organic solvent.

Embodiment 27 provides the method of any one of Embodiments 1-26, wherein about 50 wt % to about 99 wt % of the composition is at least one of oil and organic solvent.

Embodiment 28 provides the method of any one of Embodiments 1-27, wherein about 0.001 wt % to about 30 wt % of the composition is the tackifier.

Embodiment 29 provides the method of any one of Embodiments 1-28, wherein about 0.1 wt % to about 10 wt % of the composition is the tackifier.

Embodiment 30 provides the method of any one of Embodiments 1-29, wherein the tackifier comprises at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin.

Embodiment 31 provides the method of Embodiment 30, wherein the tackifier comprises at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer.

Embodiment 32 provides the method of any one of Embodiments 30-31, wherein the tackifier comprises at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

Embodiment 33 provides the method of any one of Embodiments 30-32, wherein the tackifier comprises an amine-containing polymer that has been hydrophobically modified.

Embodiment 34 provides the method of Embodiment 33, wherein the tackfier comprises at least one of a polyamine, a polyimine, a polyamide, poly(2-(N,N-dimethylamino)ethyl methacrylate), poly(2-(N,N-diethylamino)ethyl methacrylate), a poly(vinyl imidazole), and a copolymer comprising at least one of the foregoing and at least one of polyethylene, polypropylene, polyethylene oxide, polypropylene oxide, polyvinylpyridine, polyacrylic acid, polyacrylate, and polymethacrylate.

Embodiment 35 provides the method of any one of Embodiments 33-34, wherein the hydrophobic modification comprises at least one $C_4$-$C_{30}$ hydrocarbyl comprising at least one of a straight chain, a branched chain, an unsaturated C—C bond, an aryl group, and any combination thereof.

Embodiment 36 provides the method of any one of Embodiments 1-35, wherein the tackifier comprises a polyamide.

Embodiment 37 provides the method of any one of Embodiments 1-36, wherein the composition further comprises a hardening agent.

Embodiment 38 provides the method of any one of Embodiments 1-37, after fracturing the subterranean formation, placing an afterflush composition in the subterranean formation comprising a hardening agent.

Embodiment 39 provides the method of any one of Embodiments 1-38, wherein the composition further comprises a surfactant.

Embodiment 40 provides the method of Embodiment 39, wherein the surfactant is at least one of a cationic surfactant, an anionic surfactant, and non-ionic surfactant.

Embodiment 41 provides the method of any one of Embodiments 39-40, wherein the surfactant is about 0.01 wt % to about 10 wt % of the composition.

Embodiment 42 provides the method of any one of Embodiments 39-41, wherein the surfactant is about 0.1 wt % to about 5 wt % of the composition.

Embodiment 43 provides the method of any one of Embodiments 1-42, wherein the composition further comprises a clay stabilizer.

Embodiment 44 provides the method of Embodiment 43, wherein about 0.001 wt % to about 30 wt % of the composition is the clay stabilizer.

Embodiment 45 provides the method of any one of Embodiments 43-44, wherein about 0.1 wt % to about 10 wt % of the composition is the clay stabilizer.

Embodiment 46 provides the method of any one of Embodiments 43-45, wherein the clay stabilizer is a zirconium salt, an ammonium salt, alumina, a polycationic polymer, choline chloride, tetramethyl ammonium chloride, potassium chloride, potassium bromide, potassium acetate, potassium hydroxide, sodium chloride, sodium bromide, sodium acetate, sodium hydroxide, ammonium chloride, ammonium bromide, ammonium acetate, ammonium hydroxide, calcium chloride, calcium bromide, calcium acetate, calcium hydroxide, zinc chloride, zinc bromide, zinc acetate, zinc hydroxide.

Embodiment 47 provides the method of any one of Embodiments 43-46, wherein the clay stabilizer is an organic clay stabilizer.

Embodiment 48 provides the method of any one of Embodiments 43-47, wherein the clay stabilizer is a 1,3-substituted 2-hydroxypropane, wherein the 1- and 3-positions are independently substituted by a moiety selected from the group consisting of pyridinium, alkyl pyridinium, and $R_3N^+$-, wherein each R is independently selected from the group consisting of benzyl and ($C_1$-$C_{12}$)alkyl optionally substituted by one hydroxy group.

Embodiment 49 provides the method of any one of Embodiments 43-48, wherein the clay stabilizer is 1,3-bis(trimethylammonium chloride)-2-hydroxypropane.

Embodiment 50 provides the method of any one of Embodiments 1-49, wherein the composition further comprises a gel or crosslinked gel.

Embodiment 51 provides the method of any one of Embodiments 1-50, wherein the composition further comprises a crosslinked gel or a crosslinkable gel.

Embodiment 52 provides the method of Embodiment 51, wherein the crosslinked gel or crosslinkable gel comprises at least one of a linear polysaccharide, and poly(($C_2$-$C_{10}$)alkenylene), wherein the ($C_2$-$C_{10}$)alkenylene is substituted or unsubstituted.

Embodiment 53 provides the method of any one of Embodiments 51-52, wherein the crosslinked gel or crosslinkable gel comprises at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, derivatized cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 54 provides the method of any one of Embodiments 1-53, wherein the composition comprises a crosslinker comprising at least one of chromium, aluminum, antimony, zirconium, titanium, calcium, boron, iron, silicon, copper, zinc, magnesium, and an ion thereof.

Embodiment 55 provides the method of Embodiment 54, wherein the composition comprises at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, or aluminum citrate.

Embodiment 56 provides the method of any one of Embodiments 1-55, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 57 provides a system formed by the method of any one of Embodiments 1-56, the system comprising: a subterranean formation comprising the composition therein.

Embodiment 58 provides the system for performing the method of any one of Embodiments 1-56, the system comprising: a tubular disposed in a wellbore; a pump configured to pump the composition downhole.

Embodiment 59 provides a method of treating a subterranean formation, the method comprising: obtaining or providing a composition comprising a tackifier; and a proppant having a particle size of about 150 mesh or a smaller particle size; wherein the composition has a viscosity of less than about 20 cP at standard temperature and pressure; and placing the composition in a subterranean formation downhole.

Embodiment 60 provides the method of Embodiment 59, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

Embodiment 61 provides a method of treating a subterranean formation, the method comprising: obtaining or providing a composition comprising a tackifier and an organic clay stabilizer, the composition having a viscosity of less than about 20 cP at standard temperature and pressure; placing the composition in a subterranean formation downhole; fracturing the subterranean formation with the composition, to form at least one fracture; and substantially coating at least part of a face of the fracture with the composition to form at least one adhered layer of the proppant on the face.

Embodiment 62 provides the composition, apparatus, method, or system of any one or any combination of Embodiments 1-61 optionally configured such that all elements or options recited are available to use or select from.

What is claimed is:

1. A method of treating a subterranean formation, the method comprising:
providing a pad fluid comprising a tackifier and a first proppant, wherein the first proppant comprises a particle size of 150 mesh or smaller, and wherein the tackifier is at least partially coated on the first proppant, the pad fluid having a viscosity of less than about 20 cP at standard temperature and pressure;
fracturing the subterranean formation with the pad fluid and at least partially coating one or more fracture face with the tackifier;
providing a second fluid comprising a second proppant, wherein the second proppant comprises a particle size larger than the first proppant; and
placing the second fluid in fractures and fracture branches created in the subterranean formation by the pad fluid at a pressure greater than the fracture gradient of the subterranean formation.

2. The method of claim 1, wherein the viscosity of the pad fluid is about 0.001 cP to about 20 cP.

3. The method of claim 1, wherein the tackifier contacts a face of at least one fracture generated by the fracturing.

4. The method of claim 1, wherein the first proppant in the pad fluid comprises at least one proppant selected from the group consisting of sand, gravel, glass beads, polymer beads, ground products from shells and seeds such as walnut hulls, and manmade materials such as ceramic proppant, bauxite, tetrafluoroethylene materials, fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, solid glass, and combinations thereof.

5. The method of claim 1, wherein about 0.001 wt % to about 30 wt % of the pad fluid is the tackifier.

6. The method of claim 1, wherein the tackifier further comprises at least one of a shellac, a silyl-modified polyamide, a polyester, a polycarbonate, a polycarbamate, a urethane, a natural resin, an epoxy-based resin, a furan-based resin, a phenolic-based resin, a urea-aldehyde resin, a phenol/phenol formaldehyde/furfuryl alcohol resin, an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly (methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer.

7. The method of claim 1, wherein the tackifier further comprises at least one of a polyamine, a polyimine, poly(2-(N,N-dimethylamino)ethyl methacrylate), poly(2-(N,N-diethylamino)ethyl methacrylate), a poly(vinyl imidazole), and a copolymer comprising at least one of the foregoing and at least one of polyethylene, polypropylene, polyethylene oxide, polypropylene oxide, polyvinylpyridine, polyacrylic acid, polyacrylate, and polymethacrylate.

8. The method of claim 1, wherein the pad fluid further comprises a hardening agent.

9. The method of claim 1, wherein the pad fluid further comprises a surfactant.

10. The method of claim 1, wherein the pad fluid further comprises a clay stabilizer.

11. The method of claim 10, wherein the clay stabilizer is a zirconium salt, an ammonium salt, alumina, a polycationic polymer, choline chloride, tetramethyl ammonium chloride, potassium chloride, potassium bromide, potassium acetate, potassium hydroxide, sodium chloride, sodium bromide, sodium acetate, sodium hydroxide, ammonium chloride, ammonium bromide, ammonium acetate, ammonium hydroxide, calcium chloride, calcium bromide, calcium acetate, calcium hydroxide, zinc chloride, zinc bromide, zinc acetate, zinc hydroxide.

12. The method of claim 10 wherein the clay stabilizer is a 1,3-substituted 2-hydroxypropane, wherein the 1- and 3-positions are independently substituted by a moiety selected from the group consisting of pyridinium, alkyl pyridinium, and $R_3N^+$-, wherein each R is independently selected from the group consisting of benzyl, ($C_1$-$C_{12}$) alkyl, and ($C_1$-$C_{12}$) alkyl substituted by one hydroxyl group.

13. The method of claim 10, wherein the clay stabilizer is 1,3-bis(trimethylammonium chloride)-2-hydroxypropane.

14. The method of claim 1, wherein the pad fluid further comprises a crosslinked gel or a crosslinkable gel.

15. The method of claim 1, further comprising forming at least one adhered layer of the first proppant on the at least on fracture face.

16. The method of claim 1, further comprising injecting a second pad fluid into the fractures created by the pad fluid, wherein the second pad fluid comprises the tackifier, wherein the injecting the second pad fluids follows the pad fluid and is before the placing the second fluid.

17. The method of claim 1, wherein the second proppant has a particle size of 150 mesh to 1000 mesh.

18. The method of claim 1, wherein the first proppant is present in the pad fluid in an amount of about 2 wt % or more, and wherein the second proppant is present in the second fluid in an amount of about 2 wt % or more, and wherein the pad fluid and the second fluid are both aqueous and individually comprise water in an amount of about 50 wt % to about 99 wt %.

19. The method of claim 1, wherein the tackifier comprises a polyamide condensation product of a fatty acid and a polyamine.

20. A method of treating a subterranean formation, the method comprising:
placing in the subterranean formation a pad fluid comprising a tackifier, a first proppant and an organic clay stabilizer, the tackifier comprising a polyamide condensation product of a fatty acid and a polyamine, wherein the organic clay stabilizer is a 1,3-substituted 2-hydroxypropane, wherein the 1- and 3-positions are independently substituted by a moiety selected from the group consisting of pyridinium, alkyl pyridinium, and $R_3N^+$-, wherein each R is independently selected from the group consisting of benzyl, ($C_1$-$C_{12}$) alkyl, and ($C_1$-$C_{12}$) alkyl substituted by one hydroxy group, the composition having a viscosity of less than about 20 cP at standard temperature and pressure, wherein the first proppant comprises a particle size of 150 mesh or smaller;
fracturing the subterranean formation with the pad fluid, to form at least one fracture; and
substantially coating at least part of a face of the fracture with the pad fluid;
placing a second fluid in fractures and fracture branches created in the subterranean formation by the pad fluid at a pressure greater than the fracture gradient of the subterranean formation, wherein the second fluid comprises a second proppant having a larger particle size than the first proppant; and
forming at least one adhered at least partial layer of the second proppant on the face, wherein the tackifier enhance adhesion of the second proppant to the face;
wherein the fractured subterranean formation has a higher permeability than a corresponding subterranean formation subjected to a corresponding method that is free of the tackifier and the organic clay stabilizer.

\* \* \* \* \*